US012580175B2

(12) United States Patent (10) Patent No.: US 12,580,175 B2
Tsukamoto et al. (45) Date of Patent: Mar. 17, 2026

(54) METHOD FOR MANUFACTURING SECONDARY BATTERY AND SECONDARY BATTERY

(71) Applicant: PRIME PLANET ENERGY & SOLUTIONS, INC., Tokyo (JP)

(72) Inventors: Kentaro Tsukamoto, Kobe (JP); Yoshifumi Magari, Hirakata (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 979 days.

(21) Appl. No.: 17/576,264

(22) Filed: Jan. 14, 2022

(65) Prior Publication Data

US 2022/0246908 A1 Aug. 4, 2022

(30) Foreign Application Priority Data

Jan. 29, 2021 (JP) .................................. 2021-13404

(51) Int. Cl.
*H01M 4/139* (2010.01)
*B23K 26/082* (2014.01)
(Continued)

(52) U.S. Cl.
CPC ........... *H01M 4/139* (2013.01); *B23K 26/082* (2015.10); *B23K 26/38* (2013.01); *H01M 4/0404* (2013.01);
(Continued)

(58) Field of Classification Search
CPC . B23K 26/082; B23K 26/38; H01M 10/0525; H01M 10/058; H01M 10/0585;
(Continued)

(56) References Cited

U.S. PATENT DOCUMENTS

| | | |
|---|---|---|
| 2010/0028767 A1 | 2/2010 | Inose et al. |
| 2011/0094094 A1 | 4/2011 | Li et al. |

(Continued)

FOREIGN PATENT DOCUMENTS

| | | |
|---|---|---|
| CN | 109155394 A | 1/2019 |
| JP | 2006-236790 A | 9/2006 |

(Continued)

OTHER PUBLICATIONS

KR20080101725A KIPO traslation (Year: 2011).*
WO2020170598A1 Espacenet traslation (Year: 2020).*

*Primary Examiner* — Jennifer A Boyd
(74) *Attorney, Agent, or Firm* — Finnegan, Henderson, Farabow, Garrett and Dunner, LLP

(57) ABSTRACT

A secondary battery having an electrode body including a positive electrode plate, a negative electrode plate, and a separator, is manufactured by steps including preparing a positive electrode precursor, in which a positive electrode active material layer including positive electrode active material and a protective layer having lower electrical conductivity than the positive electrode active material layer has been applied to a surface of a positive electrode core, which is a strip-shaped metal foil, cutting a region of the positive electrode precursor, where the protective layer has been applied, by a continuous wave laser, preparing a negative electrode precursor, in which a negative electrode active material layer including negative electrode active material has been applied to a negative electrode core, which is a strip-shaped metal foil, and cutting a region of the negative electrode precursor, where the negative electrode active material layer has been applied, by a pulsed laser.

11 Claims, 12 Drawing Sheets

(51) Int. Cl.

| | |
|---|---|
| *B23K 26/38* | (2014.01) |
| *H01M 4/04* | (2006.01) |
| *H01M 4/62* | (2006.01) |
| *H01M 10/0585* | (2010.01) |
| *H01M 10/0587* | (2010.01) |
| *H01M 10/0525* | (2010.01) |

(52) U.S. Cl.
CPC ....... *H01M 4/621* (2013.01); *H01M 10/0585* (2013.01); *H01M 10/0587* (2013.01); *H01M 10/0525* (2013.01)

(58) Field of Classification Search
CPC ......... H01M 10/0587; H01M 10/4235; H01M 4/04; H01M 4/139; H01M 4/621; H01M 4/661
See application file for complete search history.

(56) References Cited

U.S. PATENT DOCUMENTS

| | | | |
|---|---|---|---|
| 2016/0036009 A1 | 2/2016 | Cho et al. | |
| 2017/0301900 A1* | 10/2017 | Kim ..................... | B23K 26/402 |
| 2020/0321658 A1 | 10/2020 | Fukunaga et al. | |
| 2022/0109147 A1 | 4/2022 | Tamura et al. | |

FOREIGN PATENT DOCUMENTS

| | | | |
|---|---|---|---|
| JP | 2007-014993 A | 1/2007 | |
| JP | 2010-034009 A | 2/2010 | |
| JP | 2014-165050 A | 9/2014 | |
| JP | 2016-033912 A | 3/2016 | |
| KR | 10-2008-0101725 A | 11/2008 | |
| WO | WO 2016-208686 A1 | 12/2016 | |
| WO | WO 2020/170598 A1 | 8/2020 | |

* cited by examiner

10

METHOD FOR MANUFACTURING SECONDARY BATTERY AND SECONDARY BATTERY

CROSS REFERENCE TO RELATED APPLICATIONS

This application claims priority based on Japanese Patent Application No. 2021-13404 filed on Jan. 29, 2021, and the entire contents of the application are incorporated herein by reference.

BACKGROUND

1. Technical Field

The present disclosure relates to a method for manufacturing a secondary battery and a secondary battery.

2. Description of the Related Art

A secondary battery such as a lithium ion secondary battery includes, for example, an electrode body including a positive electrode plate, a negative electrode plate, and a separator. The positive electrode plate of such a secondary battery includes a positive electrode core that is a foil-shaped metal member, and a positive electrode active material layer provided on the surface of the positive electrode core. Further, the positive electrode plate of this type of secondary battery may be provided with a protective layer to prevent an internal short circuit. Such a protective layer is applied to, for example, the surface of the positive electrode core so as to be adjacent to the side edge portion of the positive electrode active material layer. Meanwhile, the negative electrode plate includes a negative electrode core that is a foil-shaped metal member, and a negative electrode active material layer applied to the surface of the negative electrode core. In the present description, these positive electrode plate and negative electrode plate may be collectively referred to as "electrode plate". Further, the positive electrode core and the negative electrode core are collectively referred to as "electrode core", and the positive electrode active material layer and the negative electrode active material layer are also collectively referred to as "electrode active material layer".

The electrode plate having the above configuration is produced by, for example, applying an electrode active material layer or a protective layer to the surface of a large electrode core to prepare an electrode precursor, and then cutting the electrode precursor to a desired size. For example, JP2010-34009 discloses a method for manufacturing a laminated secondary battery including the steps of applying an electrode active material to a metal foil larger than the electrode area to form an electrode active material layer, and then cutting the metal foil by laser radiation. JP2016-33912 discloses a method for manufacturing a secondary battery including the steps of preparing an electrode plate including a coated portion in which a current collector is coated with an electrically active material and a non-coated portion in which the electrically active material is not coated, and cutting the non-coated portion with a continuous wave laser beam.

SUMMARY

The electrode active material layer and the protective layer applied to the surface of the electrode core tend to have a non-uniform thickness at the side edge portion thereof. In recent years, in order to meet the increasing demand for battery performance, in cutting the electrode precursor, laser cutting is performed in a region to which the electrode active material layer or the protective layer has been applied, and the electrode plate from which the side edge portion of the electrode active material layer (or the protective layer) has been cut off is cut out. As a result, a high-quality electrode plate having a uniform thickness of the electrode active material layer and the protective layer can be produced.

However, when laser cutting is performed in the region where the electrode active material layer or the protective layer has been applied, the electrode active material layer (or the protective layer) may easily fall off or peel off at the cut portion. For example, the electrode active material layer that has fallen off or peeled off from the electrode core is released inside the secondary battery as a conductive foreign matter, which may cause an internal short circuit. Meanwhile, when the protective layer falls off or peels off from the positive electrode core, the positive electrode core is exposed, hence the internal short-circuit prevention function of the protective layer may not be adequately exhibited. Therefore, the protective layer that has fallen off or peeled off may also cause an internal short circuit.

The present disclosure has been created in view of the above circumstances, and it is an object thereof to provide a technique that makes it possible to prevent the electrode active material layer and the protective layer from falling off or peeling off at the laser cutting site of the electrode plate, and to obtain a safer secondary battery.

In order to achieve the above object, the technique disclosed herein provides a method for manufacturing a secondary battery having the following configuration.

The manufacturing method disclosed herein is a method for manufacturing a secondary battery comprising an electrode body including a positive electrode plate, a negative electrode plate, and a separator. Such a manufacturing method includes a step of preparing a positive electrode precursor, in which a positive electrode active material layer including a positive electrode active material and a protective layer having lower electrical conductivity than the positive electrode active material layer have been applied to a surface of a positive electrode core, which is a strip-shaped metal foil; a step of cutting a region of the positive electrode precursor, where the protective layer has been applied by a continuous wave laser; a step of preparing a negative electrode precursor, in which a negative electrode active material layer including a negative electrode active material has been applied to a negative electrode core, which is a strip-shaped metal foil; and a step of cutting a region of the negative electrode precursor, where the negative electrode active material layer has been applied, by a pulsed laser.

The present inventors have conducted various studies on the causes of the electrode active material layer and the protective layer falling off or peeling off at the laser cutting site of the electrode plate. As a result, it was found that the falling/peeling of the negative electrode active material layer on the negative electrode plate and the falling/peeling of the protective layer on the positive electrode plate are caused by completely different factors. Specifically, when laser cutting is performed in the region where the negative electrode active material layer of the negative electrode precursor has been applied (negative electrode active material layer application region), a part of the negative electrode core melted by the heat of the laser may be mixed with a negative electrode active material layer. After that, when a metal component derived from the negative electrode core solidifies inside the negative electrode active material layer, the adhesiveness of the negative electrode active material layer is impaired, hence a slight impact easily results in the negative electrode active material layer falling off and peeling off from the negative electrode core. Meanwhile, when laser cutting is performed in a region of the positive electrode precursor where the protective layer has been applied (protective layer application region), the protective layer may be blown off and may fall off or be isolated under the effect of impact at the time of laser irradiation.

The manufacturing method disclosed herein was created in consideration of the causes of the negative electrode active material layer and the protective layer falling off or peeling off which were found by the present inventor. Specifically, in the manufacturing method disclosed herein, a pulsed laser is used for laser cutting of the negative electrode precursor. As a consequence, a large amount of energy can be concentrated and applied in a very short time period, so that cutting can be conducted in a state with a small amount of melting of the negative electrode core. As a result, it is possible to prevent the molten negative electrode core from mixing with the negative electrode active material layer. Meanwhile, in the manufacturing method disclosed herein, a continuous wave laser (CW laser) is used in laser cutting of the positive electrode precursor. Since the peak output of such a continuous wave laser is relatively small, it is possible to prevent the protective layer from being blown off by the impact at the time of laser irradiation. As described above, according to the manufacturing method disclosed herein, it is possible to prevent the negative electrode active material layer and the protective layer from falling off or peeling off at the laser cutting site of the electrode plate, so that a highly safe secondary battery can be easily manufactured.

Further, in a preferred mode of the manufacturing method disclosed herein, an output of the continuous wave laser for cutting the positive electrode precursor is 500 W to 2000 W. As a result, the positive electrode precursor can be easily cut while preventing the protective layer from falling off or peeling off.

Further, in a preferred mode of the manufacturing method disclosed herein, a scanning speed of the continuous wave laser for cutting the positive electrode precursor is 2000 mm/sec to 10000 mm/sec. As a result, the positive electrode precursor can be easily cut while suppressing the burning of the protective layer. The "scanning speed" in the present description refers to the speed at which the electrode precursor and the laser move relative to each other. That is, when only one of the electrode precursor and the laser is moved, the moving speed of the moving one is the "scanning speed". Meanwhile, when both the electrode precursor and the laser are moved, the sum of the moving speeds of each is the "scanning speed".

Further, in a preferred mode of the manufacturing method disclosed herein, a spot diameter of the continuous wave laser for cutting the positive electrode precursor is 10 μm to 60 μm. As a result, the positive electrode plate can be easily cut out from the positive electrode precursor.

Further, in a preferred mode of the manufacturing method disclosed herein, an average output of the pulsed laser for cutting the negative electrode precursor is 80 W to 300 W. As a result, the negative electrode precursor can be easily cut while preventing the molten negative electrode core and the negative electrode active material layer from being mixed with each other.

Further, in a preferred mode of the manufacturing method disclosed herein, a scanning speed of the pulsed laser for cutting the negative electrode precursor is 5000 mm/sec or less. As a result, the negative electrode precursor can be easily cut while preventing the molten negative electrode core and the negative electrode active material layer from being mixed with each other.

Further, in a preferred mode of the manufacturing method disclosed herein, the pulse width of the pulsed laser for cutting the negative electrode precursor is 30 ns to 240 ns. As a result, the negative electrode precursor can be easily cut while preventing the molten negative electrode core and the negative electrode active material layer from being mixed with each other.

Further, in a preferred mode of the manufacturing method disclosed herein, a repetition frequency of the pulsed laser for cutting the negative electrode precursor is 100 KHz to 2000 KHz. As a result, the negative electrode precursor can be easily cut while preventing the molten negative electrode core and the negative electrode active material layer from being mixed with each other.

Further, in a preferred mode of the manufacturing method disclosed herein, a spot diameter of the pulsed laser for cutting the negative electrode precursor is 10 μm to 60 μm. As a result, the negative electrode plate can be easily cut out from the negative electrode precursor.

Further, in a preferred mode of the manufacturing method disclosed herein, the positive electrode core is configured of aluminum or an aluminum alloy. In another preferred mode, the positive electrode active material is a lithium transition metal composite oxide. According to the manufacturing method disclosed herein, a positive electrode plate having these configurations can be stably manufactured.

Further, in a preferred mode of the manufacturing method disclosed herein, the negative electrode core is configured of copper or a copper alloy. In another preferred mode, the negative electrode active material is a carbon material. According to the manufacturing method disclosed herein, a negative electrode plate having these configurations can be stably manufactured. Further, as will be described in detail hereinbelow, the negative electrode active material layer irradiated with the pulsed laser becomes a coating layer including a carbon component and firmly adheres to the surface of the negative electrode core, so that the negative electrode active material layer is less likely to fall off or peel off.

Further, in a preferred mode of the manufacturing method disclosed herein, the protective layer includes ceramic particles and a binder. As a result, the internal short circuit can be suitably suppressed.

Further, a secondary battery is provided as another aspect of the technique disclosed herein. The secondary battery disclosed herein includes an electrode body including a positive electrode plate, a negative electrode plate, and a separator. The positive electrode plate of such a secondary battery includes a positive electrode core that is a foil-shaped metal member, a positive electrode active material layer that is applied to a surface of the positive electrode core and includes a positive electrode active material, and a protective layer that is applied to the surface of the positive electrode core so as to be adjacent to at least one end side the positive electrode core and includes a material having a lower electrical conductivity than the positive electrode active material layer. Meanwhile, the negative electrode plate includes a negative electrode core that is a foil-shaped metal member, and a negative electrode active material layer that is applied to a surface of the negative electrode core so as to be adjacent to at least one end side of the negative electrode core and includes a negative electrode active material layer having a negative electrode active material. A first thick portion having a thickness larger than a thickness of the positive electrode core in a central region of the positive electrode plate is provided at an end of the positive electrode core on at least one end side of the positive electrode plate adjacent to the protective layer. Further, a second thick portion having a thickness larger than a thickness of the negative electrode core in a central region of the negative electrode plate is provided at an end of the negative electrode core on at least one end side of the negative electrode plate adjacent to the negative layer, and a coating layer including a carbon material or a compound including a carbon element is adhered to a surface of the second thick portion.

The secondary battery disclosed herein is manufactured by the manufacturing method having the above configuration. The positive electrode plate of such a secondary battery is produced by cutting the protective layer application region of the positive electrode precursor with a continuous wave laser. Therefore, a first thick portion that is a trace of irradiation with the continuous wave laser is formed on the positive electrode core at the side edge portion on the protective layer side of the positive electrode plate. The thickness of the first thick portion is larger than the thickness of the positive electrode core in the central region. Meanwhile, the negative electrode plate of this secondary battery is produced by cutting the negative electrode active material layer application region of the negative electrode precursor with a pulsed laser. Therefore, a second thick portion that is a trace of irradiation with the pulsed laser is formed on the negative electrode core at one side edge portion of the region where the negative electrode active material layer of the negative electrode plate has been applied. The thickness of the second thick portion is larger than the thickness of the negative electrode core in the central region. Further, as a result of irradiating the negative electrode active material layer application region with the pulsed laser, a coating layer composed of a carbon-based component derived from the negative electrode active material or the like adheres to the second thick portion. Since such a coating layer has excellent adhesion to the surface of the negative electrode core (second thick wall portion), the coating layer is prevented from peeling and falling off from the negative electrode core and becoming a conductive foreign matter.

Further, in a preferred mode of the secondary battery disclosed herein, a ratio of a thickness of the coating layer of the second thick portion to a thickness of the negative electrode active material layer is 0.01 to 0.2. The negative electrode core can be adequately cut by adjusting the conditions of cutting with the pulsed laser so that the coating layer having such a thickness is formed.

Further, in a preferred mode of the secondary battery disclosed herein, the second thick portion of the negative electrode core has a claw shape including in a thickness direction thereof a cap portion protruding on both sides, and a recess formed between the cap portion and the negative electrode core. The second thick portion that is a trace of irradiation with the pulsed laser is formed into a claw shape as described above. The claw-shaped second thick portion exerts an excellent anchoring effect to firmly hold the negative electrode active material layer and the coating layer, and can suitably prevent these from falling off or peeling off. Where such a claw-shaped second thick portion is formed on the negative electrode core, the separator in contact with the second thick portion may be damaged. However, in the technique disclosed herein, since the second thick portion is covered with the coating layer, damage to the separator can be suitably prevented.

Further, in a preferred mode of the secondary battery disclosed herein, the first thick portion of the positive electrode core protrudes outward from an end face of the protective layer. As a result, the movement of the protective layer can be suppressed, and the protective layer can be more suitably prevented from falling off.

Further, in a preferred mode of the secondary battery disclosed herein, the thickness of the second thick portion of the negative electrode core is smaller than the thickness of the first thick portion of the positive electrode core. As described above, in the technique disclosed herein, in order to prevent the metal component of the molten negative electrode core from being mixed into the negative electrode active material layer, the amount of melting of the negative electrode core is reduced by using a pulsed laser. The second thick portion formed by such a pulsed laser tends to be smaller than the first thick portion formed by the continuous wave laser.

Further, in a preferred mode of the secondary battery disclosed herein, a boundary between the coating layer and the negative electrode active material layer is located outside the side edge portion of the positive electrode active material layer. A merit of the coating layer is that peeling off or falling off from the negative electrode core is unlikely, but the drawback is that the function as a negative electrode active material layer (rapid increase/release ability of charge carriers) is poor. Therefore, where the coating layer and the positive electrode active material layer are opposed to each other, the distribution of the charge/discharge reaction on the reaction surface of the electrode body becomes non-uniform, which may cause the charge carriers to precipitate. From this viewpoint, the coating layer is preferably arranged in a region that does not contribute to the charge/discharge reaction (that is, outside the side edge portion of the positive electrode active material layer).

Further, in a preferred mode of the secondary battery disclosed herein, the electrode body is a wound electrode body in which the strip-shaped positive electrode plate and the strip-shaped negative electrode plate are wound with a strip-shaped separator interposed therebetween, the positive electrode plate has a plurality of positive electrode tabs protruding outward from one side surface in a winding axis direction of the wound electrode body, and the negative electrode plate has a plurality of negative electrode tabs protruding outward from the other side surface in the winding axis direction of the wound electrode body. When a wound electrode body having this kind of electrode tabs is produced, the cutting distance when cutting the protective layer application region or the negative electrode active material layer application region tends to increase, so that the electrode active material layer or the protective layer is likely to fall off or peel off. However, according to the technique disclosed herein, even when the cutting distance in the protective layer application region or the negative electrode active material layer application region becomes large, the electrode active material layer and the protective layer can be adequately prevented from falling off or peeling off.

Further, as described above, the positive electrode core is preferably configured of aluminum or an aluminum alloy, and the negative electrode core is preferably configured of copper or a copper alloy. Further, the protective layer preferably includes ceramic particles and a binder.

DETAILED DESCRIPTION

Hereinafter, embodiments of the technique disclosed herein will be described with reference to the drawings. It should be noted that matters other than those specifically mentioned in the present description, which are necessary for implementing the technique disclosed herein (for example, general configuration and manufacturing process of a battery) can be ascertained as design matters for a person skilled in the art on the basis of the related art in the pertinent field. The technique disclosed herein can be implemented based on the contents disclosed in the present description and the common technical knowledge in the art. In the present description, the notation of "A to B" indicating the range is inclusive of the meanings of "A or more and B or less", as well as "preferably larger than A" and "preferably smaller than B".

In the present description, the "secondary battery" refers to a general storage device in which a charge/discharge reaction is induced by the movement of charge carriers between a pair of electrodes (positive electrode and negative electrode) via an electrolyte. Such a secondary battery is inclusive of not only a so-called storage battery such as a lithium ion secondary battery, a nickel hydrogen battery, a nickel cadmium battery, and the like but also a capacitor such as an electric double layer capacitor. Hereinafter, among the above-mentioned secondary batteries, an embodiment targeting a lithium ion secondary battery will be described.

Method for Manufacturing Secondary Battery

Figures 1, 2:
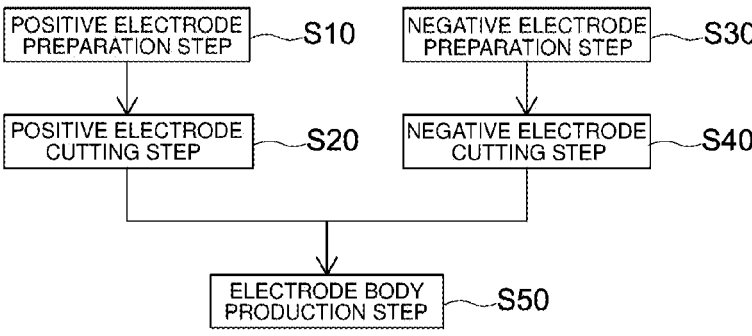
FIG. 1 is a flowchart illustrating a method for manufacturing a secondary battery according to an embodiment.
FIG. 2 is a plan view schematically showing a positive electrode plate produced in the method for manufacturing a secondary battery according to an embodiment.
Figure 3:
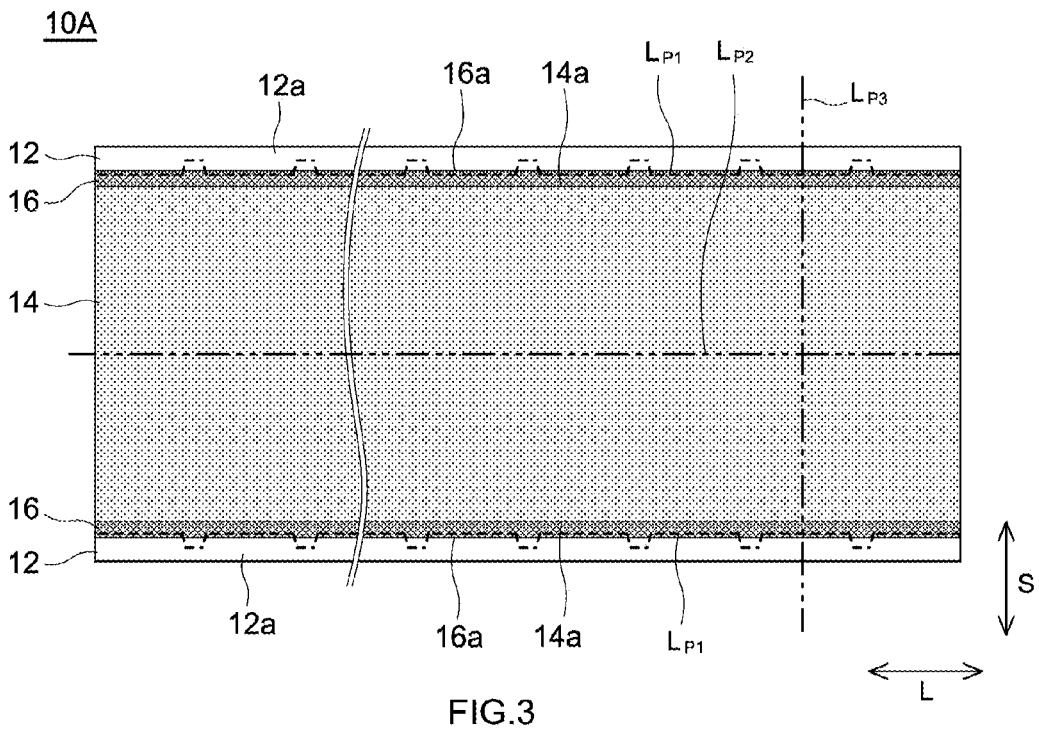
FIG. 3 is a plan view illustrating the production of a positive electrode plate in the method for manufacturing a secondary battery according to an embodiment.
Figure 4:
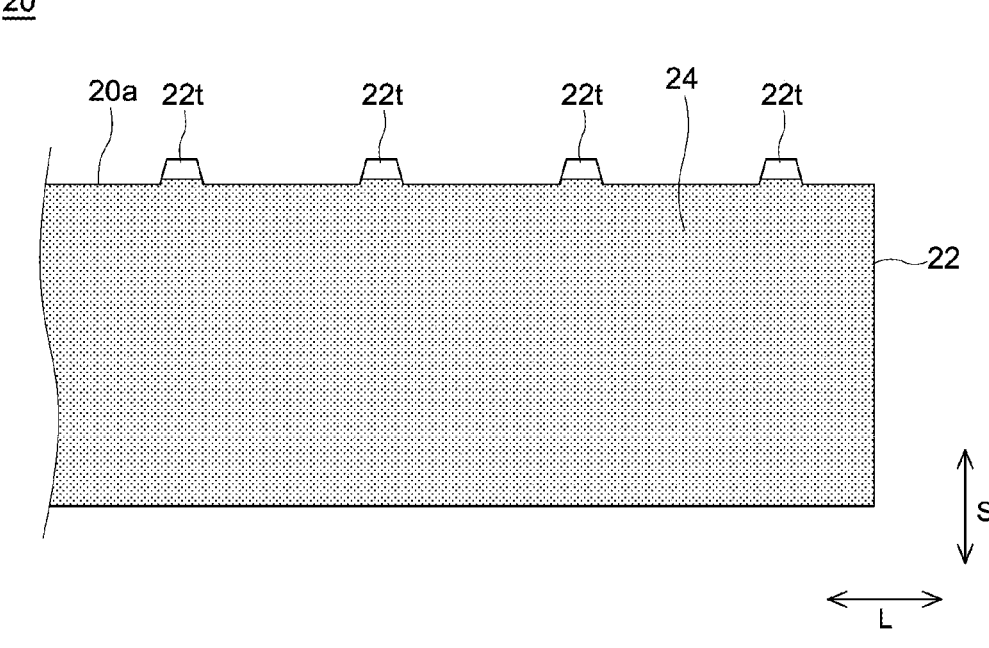
FIG. 4 is a plan view schematically showing a negative electrode plate produced in the method for manufacturing a secondary battery according to an embodiment.
Figure 5:
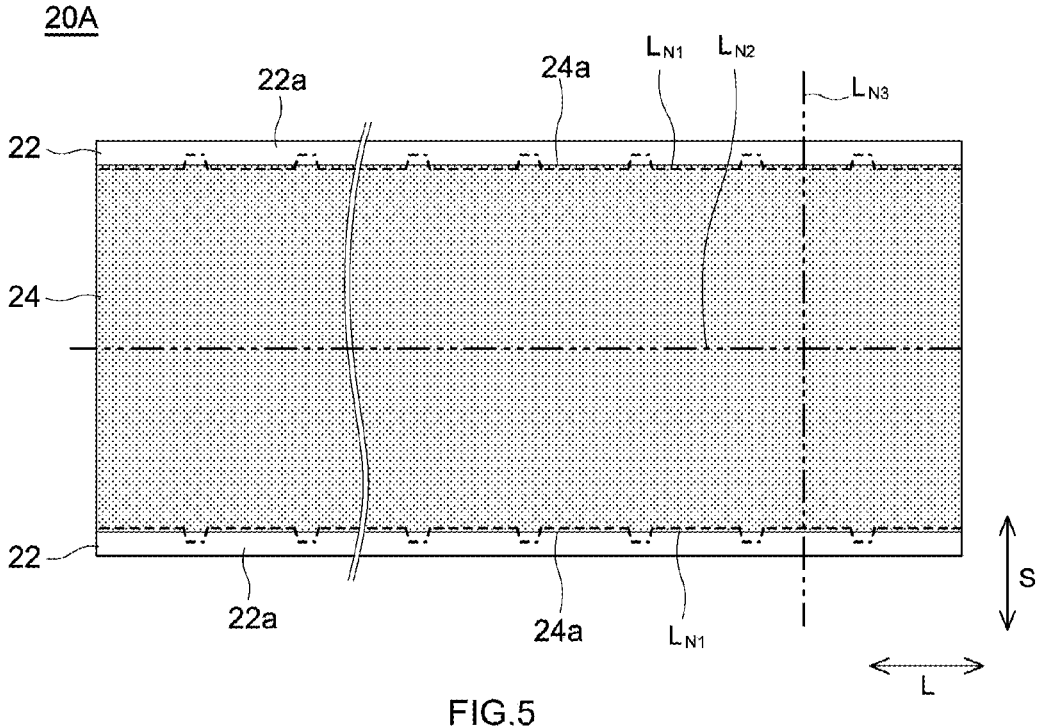
FIG. 5 is a plan view illustrating the production of a negative electrode plate in the method for manufacturing a secondary battery according to an embodiment.
Figure 6:
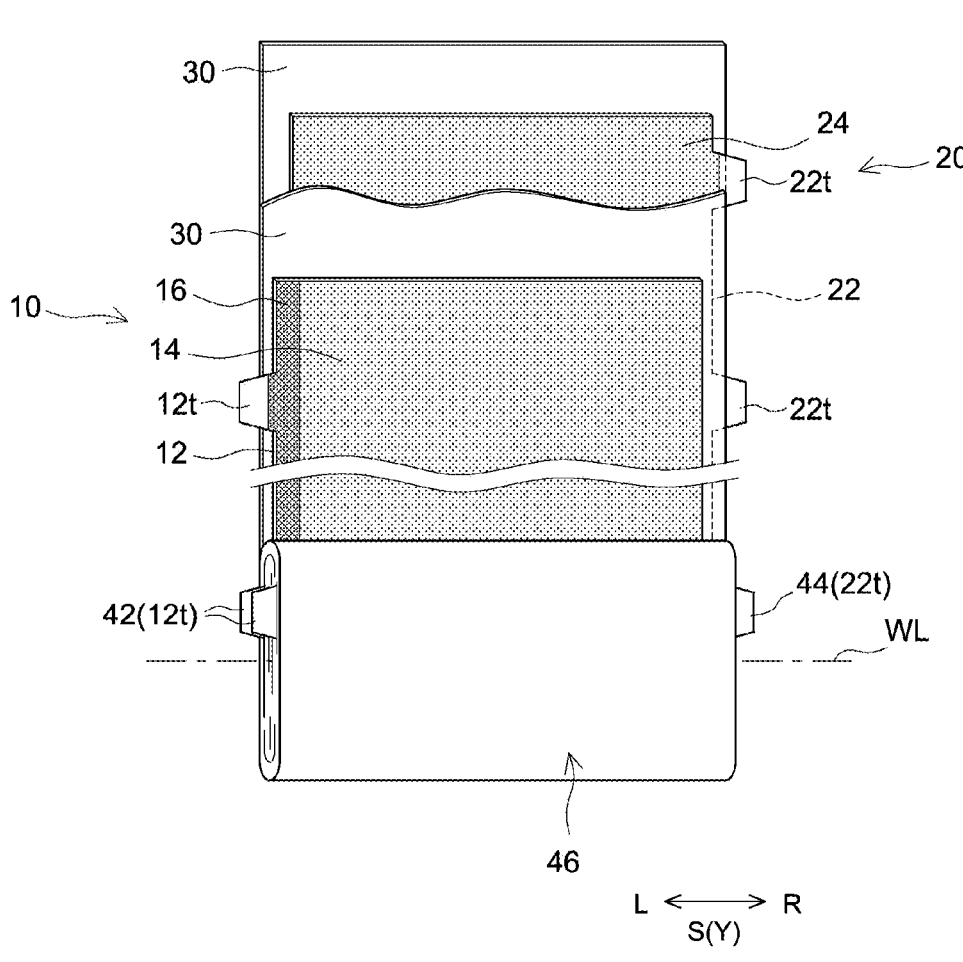
FIG. 6 is a schematic view showing a configuration of a wound electrode body manufactured in the method for manufacturing a secondary battery according to an embodiment.
Figure 7:
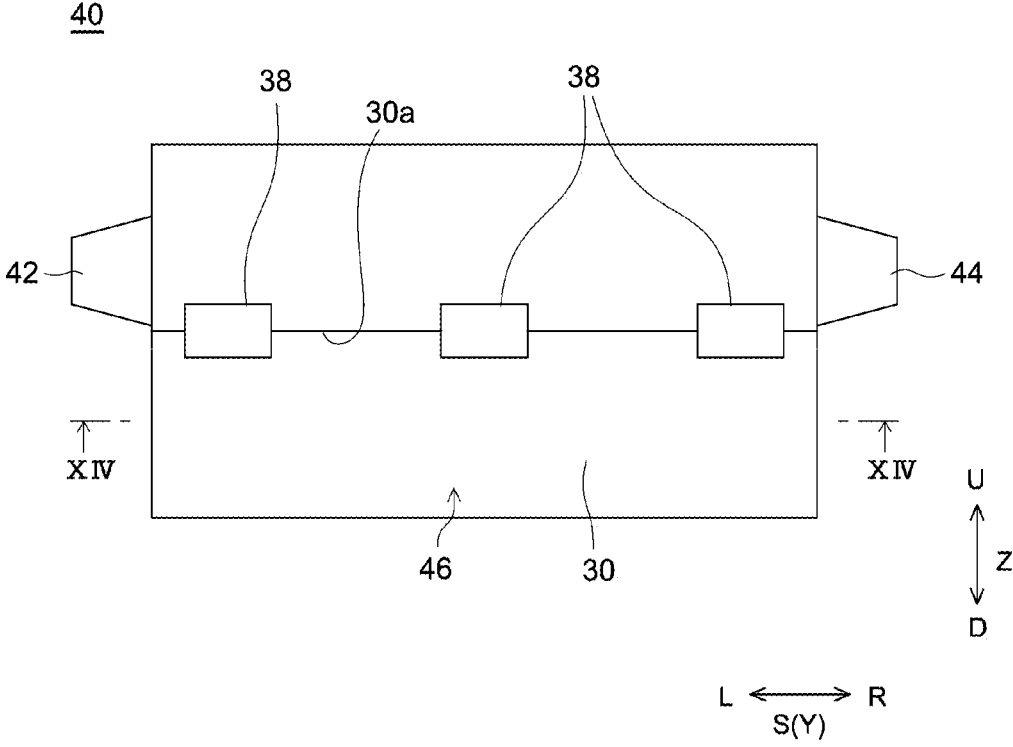
FIG. 7 is a front view schematically showing the wound electrode body of FIG. 6.

Hereinafter, an embodiment of the method for manufacturing a secondary battery disclosed herein will be described. FIG. 1 is a flowchart illustrating a method for manufacturing a secondary battery according to the present embodiment. FIG. 2 is a plan view schematically showing a positive electrode plate produced in the method for manufacturing a secondary battery according to the present embodiment. FIG. 3 is a plan view illustrating the production of a positive electrode plate in the method for manufacturing a secondary battery according to the present embodiment. FIG. 4 is a plan view schematically showing a negative electrode plate produced in the method for manufacturing a secondary battery according to the present embodiment. FIG. 5 is a plan view illustrating the production of the negative electrode plate in the method for manufacturing the secondary battery according to the present embodiment. FIG. 6 is a schematic view showing the configuration of a wound electrode body produced in the method for manufacturing a secondary battery according to the present embodiment. FIG. 7 is a front view schematically showing the wound electrode body of FIG. 6. Reference symbol S in FIGS. 2 to 7 indicates the lateral direction of the electrode plate (positive electrode plate and/or negative electrode plate), and reference symbol L indicates the longitudinal direction of the electrode plate.

1. Production of Positive Electrode Plate

As shown in FIG. 1, in the manufacturing method according to the present embodiment, first, a positive electrode preparation step S10 and a positive electrode cutting step S20 are implemented. As a result, the positive electrode plate 10 (see FIG. 2) for the secondary battery is produced. Here, after explaining the configuration of the positive electrode plate 10 to be produced, each of the positive electrode preparation step S10 and the positive electrode cutting step S20 will be described.

Construction of Positive Electrode Plate

As shown in FIG. 2, a positive electrode plate 10 produced by the manufacturing method according to the present embodiment is a long strip-shaped member. The positive electrode plate 10 has a positive electrode core 12 that is a foil-shaped metal member, a positive electrode active material layer 14 applied to the surface of the positive electrode core 12, and a protective layer 16 that is applied to the surface of the positive electrode core 12 so as to be adjacent to a side edge portion 10a of the positive electrode plate 10. Further, a plurality of positive electrode tabs 12t protruding to the outside (upper side in FIG. 2) in the lateral direction S is provided on the side edge portion 10a of the positive electrode plate 10 at predetermined intervals in the longitudinal direction L. The positive electrode tabs 12t are parts of the positive electrode core 12. Specifically, the positive electrode tabs 12t are formed by causing the positive electrode core 12 to which the positive electrode active material layer 14 or the protective layer 16 are not applied to protrude from the side edge portion 10a of the positive electrode plate 10 to the outside in the lateral direction S. From the viewpoint of battery performance, it is preferable that the positive electrode active material layer 14 and the protective layer 16 be applied to both surfaces of the positive electrode core 12. Further, the protective layer 16 may be also applied so that a part thereof covers the side edge portion 14a of the positive electrode active material layer 14.

For each member constituting the positive electrode plate 10, a conventionally known material that can be used in a general secondary battery (for example, a lithium ion secondary battery) can be used without particular limitation. For example, a metal material having a predetermined conductivity can be suitably used for the positive electrode core 12. The positive electrode core 12 is preferably configured of, for example, aluminum, an aluminum alloy, or the like. The thickness of the positive electrode core 12 is preferably 3 μm to 30 μm, more preferably 3 μm to 20 μm, and even more preferably 5 μm to 15 μm.

Further, the positive electrode active material layer 14 includes a positive electrode active material. The positive electrode active material is a material capable of reversibly occluding and releasing charge carriers. From the viewpoint of stably producing a high-performance positive electrode plate 10, a lithium transition metal composite oxide is preferable as the positive electrode active material. Among the lithium transition metal composite oxides, a lithium transition metal composite oxide including at least one of the group consisting of nickel (Ni), cobalt (Co) and manganese (Mn) as the transition metal is particularly suitable. Specific examples include lithium-nickel-cobalt-manganese-based composite oxides (NCM), lithium-nickel-based composite oxides, lithium-cobalt-based composite oxides, lithium-manganese-based composite oxides, lithium-nickel-manganese-based composite oxides, lithium-nickel-cobalt-aluminum-based composite oxides (NCA), lithium-iron-nickel-manganese-based composite oxides, and the like. Moreover, as a preferable example of a lithium transition metal composite oxide containing no nickel, cobalt or manganese, lithium-iron phosphate-based composite oxide (LFP) and the like can be mentioned. The term "lithium-nickel-cobalt-manganese-based composite oxide" as used in the present description is a term inclusive of oxides containing additive elements in addition to the main constituent elements (Li, Ni, Co, Mn, O). Examples of such additive elements include transition metal elements and typical metal elements such as Mg, Ca, Al, Ti, V, Cr, Si, Y, Zr, Nb, Mo, Hf, Ta, W, Na, Fe, Zn, Sn, and the like. Further, the additive element may be a metalloid element such as B, C, Si, P, and the like or a non-metal element such as S, F, Cl, Br, I, and the like. This also applies to other lithium transition metal composite oxides described as " . . . -based composite oxides". Further, the positive electrode active material layer 14 may include additives other than the positive electrode active material. Examples of such additives include conductive materials, binders, silicon-based materials, and the like. Specific example of the conductive material is a carbon material such as acetylene black (AB). Specific example of the binder is a resin binder such as polyvinylidene fluoride (PVdF). When the total solid content of the positive electrode active material layer 14 is 100% by mass, the content of the positive electrode active material is approximately 80% by mass or more, and typically 90% by mass or more. The positive electrode active material may constitute 95% by mass or more of the positive electrode active material layer 14. The thickness of the positive electrode active material layer 14 is preferably 10 μm to 500 μm, more preferably 30 μm to 400 μm, and even more preferably 50 μm to 300 μm.

Meanwhile, the protective layer 16 is configured to have lower electrical conductivity than the positive electrode active material layer 14. By applying the protective layer 16 so as to be adjacent to the side edge portion 10a of the positive electrode plate 10, the internal short circuit due to contact between the positive electrode core 12 and the negative electrode active material layer 24 when the separator 30 of the electrode body 40 is damaged can be prevented. For example, it is preferable to form a layer including insulating ceramic particles as the protective layer 16. Examples of such ceramic particles include inorganic oxides such as alumina ($Al_2O_3$), magnesia (MgO), silica ($SiO_2$), titania ($TiO_2$), and the like, nitrides such as aluminum nitride, silicon nitride, and the like, metal hydroxides such as calcium hydroxide, magnesium hydroxide, aluminum hydroxide, and the like, clay minerals such as mica, talc, boehmite, zeolite, apatite, kaolin, and the like, glass fibers, and the like. Among the above, alumina, boehmite, aluminum hydroxide, silica and titania are preferable in consideration of insulation and heat resistance. Further, the protective layer 16 may include a binder for fixing the ceramic particles to the surface of the positive electrode core 12. Examples of such a binder include a resin binder such as polyvinylidene fluoride (PVdF) and the like. The protective layer 16 may have lower electrical conductivity than the positive electrode active material layer 14, and is not limited to the above configuration. For example, the protective layer 16 may be configured of an insulating resin instead of the ceramic particles. Further, a small amount of a conductive material such as a carbon material (acetylene black) may be added to the protective layer 16. Further, the thickness of the protective layer 16 is preferably less than the thickness of the positive electrode active material layer 14. For example, the thickness of the protective layer 16 is preferably 1 μm to 100 μm, more preferably 5 μm to 80 μm, and even more preferably 8 μm to 50 μm.

Positive Electrode Preparation Step S10

As described above, in the manufacturing method according to the present embodiment, the positive electrode plate 10 having the above configuration is produced by carrying out the positive electrode preparation step S10 and the positive electrode cutting step S20. Here, first, the positive electrode preparation step S10 for preparing the positive electrode precursor 10A, which is the precursor of the positive electrode plate 10, is carried out. As shown in FIG. 3, the positive electrode precursor 10A includes a positive electrode core 12 which is a strip-shaped metal foil. The area of the positive electrode core 12 of the positive electrode precursor 10A is larger than the area of the positive electrode plate 10 described above. The positive electrode active material layer 14 and the protective layer 16 are applied to the surface of the positive electrode core 12. Specifically, the positive electrode active material layer 14 is applied to the central portion of the positive electrode precursor 10A in the lateral direction S so as to extend along the longitudinal direction L. A pair of protective layers 16 is applied to each region adjacent to the side edge portion 14a of the positive electrode active material layer 14 so as to extend along the longitudinal direction L. The positive electrode active material layer 14 and the protective layer 16 are not applied to both side edges of the positive electrode precursor 10A (regions outside the protective layer 16 in the lateral direction S), and a positive electrode exposed portion 12a where the positive electrode core 12 is exposed is formed. A means for preparing the positive electrode precursor 10A having the above configuration is not particularly limited, and various conventionally known methods can be adopted without particular limitation. For example, the positive electrode precursor 10A can be produced by coating a positive electrode paste which is a precursor of the positive electrode active material layer 14 and a protective paste which is a precursor of the protective layer 16 on the surface (both sides) of the strip-shaped positive electrode core 12, and drying each paste.

Positive Electrode Cutting Step S20

In this step, the positive electrode plate 10 having the configuration shown in FIG. 2 is cut out from the positive electrode precursor 10A having the configuration shown in FIG. 3. Here, in the positive electrode cutting step S20 in the present embodiment, the region of the positive electrode precursor 10A to which the protective layer 16 has been applied (protective layer application region) is cut by a laser. Specifically, as shown by a dotted line $L_{P1}$ in FIG. 3, the laser is scanned on the protective layer 16 along the side edge portion 14a of the positive electrode active material layer 14. As a result, the side edge portion 16a of the protective layer 16 where the thickness tends to be non-uniform can be cut off, and the positive electrode plate 10 having a uniform thickness of the protective layer 16 can be produced. Further, the laser in this step scans outward in the lateral direction S at regular intervals, cuts a part of the positive electrode exposed portion 12a, and then scans inward in the lateral direction S in order to cut the protective layer application region again (see the dotted line 1). As a result, parts of the positive electrode exposed portion 12a are cut out in a convex shape, and a plurality of positive electrode tabs 12t protruding to the outside in the lateral direction S is formed. Further, in this step, as shown by a two-dot-dash line $L_{P2}$ in FIG. 3, the central portion of the positive electrode precursor 10A in the lateral direction S is cut along the longitudinal direction L. As a result, the positive electrode plate 10 in which the protective layer 16 and the positive electrode tabs 12t are formed only on one side edge portion in the lateral direction S can be produced. Further, in this step, as shown by a two-dot-dash line $L_{P3}$ in FIG. 3, the positive electrode precursor 10A is cut along the lateral direction S at a predetermined interval in the longitudinal direction L. As a result, the strip-shaped positive electrode plate 10 having a desired length is produced. It is not necessary to use laser cutting for cutting the positive electrode precursor 10A along the two-dot-dash line lines $L_{P2}$ and $L_{P3}$. For example, a cutting blade, a mold, a cutter, or the like can be used for cutting the positive electrode precursor 10A along the two-dot-dash line lines $L_{P2}$ and $L_{P3}$.

Here, where a large impact acts upon the protective layer 16 in the laser cutting of the protective layer application region shown by the dotted line $L_{P1}$, the protective layer 16 may be blown off and can fall off or peel off. In such a case, the positive electrode core 12 is exposed at the side edge portion 10a of the produced positive electrode plate 10, so that an internal short circuit is likely to occur. In order to prevent the protective layer 16 from falling off or peeling off, in the positive electrode cutting step S20 in the present embodiment, a continuous wave laser (CW laser) is used in cutting the protective layer application region along the dotted line $L_{P1}$. Such a continuous wave laser continuously generates a constant output, and the peak output thereof is relatively small as compared with that of a pulsed laser described hereinbelow. Therefore, the application of a large impact such that the protective layer 16 is blown off to the protective layer 16 can be suppressed, and the protective layer 16 can be adequately prevented from falling off or peeling off.

The conditions of the continuous wave laser that cuts the protective layer application region are not particularly limited, and are preferably adjusted, as appropriate, according to the structure of the positive electrode precursor 10A (typically, the thickness and materials of the protective layer

16 and the positive electrode core 12). For example, the output of the continuous wave laser is preferably 50K W to 2000 W, more preferably 700 W to 1500 W, and can be set to, for example, 1000 W. As a result, the positive electrode precursor 10A can be easily cut while preventing the protective layer 16 from falling off or peeling off. Specifically, as the output of the continuous wave laser increases, cutting of the positive electrode precursor 10A tends to be facilitated. Meanwhile, as the output of the continuous wave laser decreases, the impact applied to the protective layer 16 decreases, so that the protective layer 16 can be more preferably prevented from falling off or peeling off.

The scanning speed of the continuous wave laser is preferably 2000 mm/sec to 10000 mm/sec, more preferably 4000 mm/sec to 8000 mm/sec, and can be set to, for example, 6000 mm/sec. As a result, the positive electrode precursor 10A can be easily cut while suppressing the burning of the protective layer 16. Specifically, as the scanning speed of the continuous wave laser is increased, the heat applied to the protective layer 16 becomes smaller, so that the protective layer 16 is less likely to be burnt out due to excessive heat. Meanwhile, as the scanning speed is slowed down, the laser easily penetrates to the opposite side of the positive electrode precursor 10A, so that cutting of the positive electrode precursor 10A tends to be facilitated. Meanwhile, the spot diameter of the continuous wave laser is preferably 10 μm to 60 μm, and more preferably 20 μm to 50 μm. As a result, the positive electrode plate can be easily cut out from the positive electrode precursor.

2. Production of Negative Electrode Plate

Next, in the manufacturing method according to the present embodiment, as shown in FIG. 1, a negative electrode preparation step S30 and a negative electrode cutting step S40 are carried out. As a result, the negative electrode plate 20 (see FIG. 4) for the secondary battery is produced. Similar to the "Production of Positive Electrode Plate", each of the negative electrode preparation step S30 and the negative electrode cutting step S40 will be described hereinbelow after explaining the configuration of the object to be produced (negative electrode plate 20).

Configuration of Negative Electrode Plate

The negative electrode plate 20 produced by the manufacturing method according to the present embodiment is a long strip-shaped member (see FIG. 4). The negative electrode plate 20 includes a negative electrode core 22 that is a foil-shaped metal member, and a negative electrode active material layer 24 applied to the surface of the negative electrode core 22. Further, a plurality of negative electrode tabs 221 protruding to the outside (upper side in FIG. 4) in the lateral direction S is provided on a side edge portion 20a of the negative electrode plate 20 at predetermined intervals in the longitudinal direction L. The negative electrode tabs 22t are parts of the negative electrode core 22. Specifically, the negative electrode tabs 22t are formed by causing the negative electrode core 22 to which the negative electrode active material layer 24 is not applied to protrude from the side edge portion 20a of the negative electrode plate 20 outward in the lateral direction S. From the viewpoint of battery performance, it is preferable that the negative electrode active material layer 24 be applied to both surfaces of the negative electrode core 22.

Similar to the positive electrode plate 10, for each member constituting the negative electrode plate 20, a conventionally known material that can be used in a general secondary battery can be used without particular limitation. For example, a metal material having a predetermined conductivity can be suitably used for the negative electrode core 22. The negative electrode core 22 is preferably configured of, for example, copper or a copper alloy. Further, the thickness of the negative electrode core 22 is preferably 3 μm to 30 μm, more preferably 2 μm to 20 μm, and even more preferably 5 μm to 15 μm.

The negative electrode active material layer 24 is a layer including a negative electrode active material. A material capable of reversibly occluding and releasing charge carriers in relation to the above-mentioned positive electrode active material is used as the negative electrode active material. Examples of such a negative electrode active material include a carbon material, a silicon-based material, and the like. As the carbon material, for example, graphite, hard carbon, soft carbon, amorphous carbon, and the like can be used. Further, amorphous carbon-coated graphite in which the surface of graphite is coated with amorphous carbon can also be used. Meanwhile, examples of the silicon-based material include silicon, silicon oxide (silica), and the like. Further, the silicon-based material may include other metal elements (for example, alkaline earth metals) and oxides thereof. Further, the negative electrode active material layer 24 may include an additive other than the negative electrode active material. Examples of such additives include binders, thickeners and the like. Specific examples of the binder include a rubber-based binder such as styrene-butadiene rubber (SBR) and the like. Further, specific examples of the thickener include carboxymethyl cellulose (CMC) and the like. When the total solid content of the negative electrode active material layer 24 is 100% by mass, the content of the negative electrode active material is approximately 30% by mass or more, and typically 50% by mass or more. The negative electrode active material may constitute 80% by mass or more of the negative electrode active material layer 24, or may constitute 90% by mass or more. The thickness of the negative electrode active material layer 24 is preferably 10 μm to 50 μm, more preferably 30 μm to 400 μm, and even more preferably 50 μm to 300 μm.

As will be described in detail hereinbelow, in the manufacturing method according to the present embodiment, a part of the negative electrode active material layer 24 irradiated with the laser becomes a coating layer 24b (see FIG. 14) composed of a carbon-based material and adheres to the surface of the negative electrode core 22. Since the coating layer 24b has excellent adhesion to the negative electrode core 22, the coating layer can be prevented from falling off or peeling off and being released inside of the battery as a conductive foreign matter after the construction of the secondary battery. From the viewpoint of adequately forming such a coating layer, the negative electrode active material contained in the negative electrode active material layer 24 is preferably a carbon material. However, as described above, the material of the negative electrode active material does not limit the technique disclosed herein. That is, the technique disclosed herein is inclusive of a form in which a silicon-based material is used as the negative electrode active material. Even when a silicon-based material is used as the negative electrode active material, where the negative electrode active material layer 24 includes a carbon element, the coating layer 24b can be formed because the negative electrode active material layer 24 is carbonized by the pulsed laser described hereinbelow.

Negative Electrode Preparation Step S30

As shown in FIG. 1, in the manufacturing method according to the present embodiment, the negative electrode plate 20 having the above configuration is produced by carrying out the negative electrode preparation step S30 and the negative electrode cutting step S40. In the negative electrode preparation step S30, the negative electrode precursor 20A, which is the precursor of the negative electrode plate 20, is prepared. As shown in FIG. 5, the negative electrode precursor 20A includes a negative electrode core 22 which is a strip-shaped metal foil. The area of the negative electrode core 22 of the negative electrode precursor 20A is larger than the area of the negative electrode plate 20 described above. The negative electrode active material layer 24 is applied to the surface of the negative electrode core 22. Specifically, the negative electrode active material layer 24 is applied to the center of the negative electrode precursor 20A in the lateral direction S so as to extend along the longitudinal direction L. The negative electrode active material layer 24 is not applied to both side edges of the negative electrode precursor 20A (regions outside the negative electrode active material layer 24 in the lateral direction S), and a negative electrode exposed portion 22a where the negative electrode core 22 is exposed is formed. A means for preparing the negative electrode precursor 20A having the above configuration is not particularly limited, and various conventionally known methods can be adopted without particular limitation. For example, similarly to the production of the positive electrode precursor 10A, the negative electrode precursor 20A having the negative electrode active material layer 24 applied to the surface of the negative electrode core 22 can be produced by coating and drying a raw material paste.

Negative Electrode Cutting Step S40

In this step, the negative electrode plate 20 having the configuration shown in FIG. 4 is cut out from the negative electrode precursor 20A having the configuration shown in FIG. 5. In the negative electrode cutting step S40, the region to which the negative electrode active material layer 24 of the negative electrode precursor 20A has been applied (negative electrode active material layer application region) is cut with a laser. Specifically, as shown by a dotted line $L_{N1}$ in FIG. 5, the laser is scanned on the negative electrode active material layer 24 along a side edge portion 24a of the negative electrode active material layer 24. As a result, the side edge portion 24a of the negative electrode active material layer 24 where the thickness tends to be non-uniform can be cut off, and the negative electrode plate 20 having a uniform thickness of the negative electrode active material layer 24 can be produced. Further, the laser in this step scans outward in the lateral direction S at regular intervals, cuts a part of the negative electrode exposed portion 22a, and then scans inward in the lateral direction S in order to cut the negative electrode active material layer application region again (see dotted line $L_{P1}$). As a result, parts of the negative electrode exposed portion 22a are cut out in a convex shape, and a plurality of negative electrode tabs 221 protruding to the outside in the lateral direction S is formed. Further, in the present embodiment, as shown by a two-dot-dash line $L_{N2}$ in FIG. 5, the central portion of the negative electrode precursor 20A in the lateral direction S is cut along the longitudinal direction L. As a result, as shown in FIG. 4, the negative electrode plate 20 in which the negative electrode tabs 22t are formed only on one side edge portion 20a in the lateral direction S can be produced. Further, in this step, as shown by a two-dot-dash line LN, the negative electrode precursor 20A is cut along the lateral direction S at a predetermined interval in the longitudinal direction L. As a result, the strip-shaped negative electrode plate 20 having a desired length is produced. Similar to the cutting of the positive electrode precursor 10A described above, laser cutting may not be used for cutting the negative electrode precursor 20A along the two-dot-dash line lines $L_{N2}$ and $L_{N3}$, and a mold, a cutter, or the like may be used.

Here, where the negative electrode active material layer application region is cut with a laser as shown by the dotted line $L_{N1}$, a part of the negative electrode core 22 melted by the heat of the laser may be mixed with the negative electrode active material layer 24. When the metal component derived from the negative electrode core 22 solidifies in the negative electrode active material layer 24, the adhesiveness of the negative electrode active material layer 24 is significantly lost, and there is a risk of the negative electrode active material layer easily falling off or peeling off from the negative electrode core 22 under a slight impact. In the negative electrode cutting step S40 in the present embodiment, in order to prevent the negative electrode active material layer 24 from falling off or peeling off, a pulsed laser is used in cutting the negative electrode active material layer application region of the negative electrode precursor 20A. Since such a pulsed laser can concentrate and apply a large amount of energy in a short time slot (high peak output), the amount of melting of the negative electrode core 22 can be reduced during laser irradiation. As a result, it is possible to prevent a part of the molten negative electrode core 22 from being mixed with the negative electrode active material layer 24, and to appropriately prevent the negative electrode active material layer 24 from falling off or peeling off.

The conditions of the pulsed laser that cuts the negative electrode active material layer application region are not particularly limited and are preferably adjusted, as appropriate, according to the structure of the negative electrode precursor 20A (typically, the thickness and material of the negative electrode active material layer 24 and the negative electrode core 22). For example, the average output of the pulsed laser is preferably 80 W to 300 W, more preferably 120 W to 250 W, and can be set to, for example, 210 W. As a result, the negative electrode precursor 20A can be easily cut while preventing the negative electrode active material layer 24 from falling off or peeling off. Specifically, as the average output of the pulsed laser increases, cutting of the negative electrode precursor 20A is likely to be facilitated. Meanwhile, as the average output of the pulsed laser becomes smaller, the impact at the time of laser irradiation becomes smaller, so that it is possible to prevent a part of the negative electrode active material layer 24 from being blown off by the impact of the laser.

Further, the scanning speed of the pulsed laser is preferably 5000 mm/sec or less, and more preferably 3000 mm/sec or less. By slowing down the scanning speed in this way, sufficient heat can be applied to the negative electrode precursor 20A to adequately cut the negative electrode core 22. Meanwhile, the lower limit of the scanning speed of the pulsed laser is not particularly limited and may be 20 mm/sec or more. From the viewpoint of improving the manufacturing efficiency by shortening the cutting time, the lower limit of the scanning speed of the pulsed laser is preferably 200 mm/sec or more, and more preferably 500 mm/sec or more.

Next, the pulse width of the pulsed laser is preferably 30 ns to 240 ns, and more preferably 120 ns to 240 ns. As a result, the negative electrode precursor 20A can be easily cut while preventing the molten negative electrode core 22 and the negative electrode active material layer 24 from being mixed with each other. Specifically, since the peak output tends to increase as the pulse width of the pulsed laser becomes shorter, it becomes easy to reduce the amount of melting of the negative electrode core 22 irradiated with the laser. Meanwhile, as the pulse width becomes longer, the impact applied to the negative electrode active material layer 24 becomes smaller, so that it is possible to prevent a part of the negative electrode active material layer 24 from being blown off during laser irradiation.

The repetition frequency of the pulsed laser is preferably 100 KHz to 2000 KHz, and more preferably 300 KHz to 1500 KHz. As a result, the negative electrode precursor 20A can be easily cut while preventing the molten negative electrode core 22 and the negative electrode active material layer 24 from being mixed with each other. Specifically, when the frequency of the pulsed laser is small, the peak output becomes large, so that cutting of the negative electrode core 22 is facilitated. Meanwhile, when the frequency of the pulsed laser is large, the peak output becomes small, so that it is possible to prevent a part of the negative electrode active material layer 24 irradiated with the laser from being blown off. Further, the spot diameter of the pulsed laser is preferably 10 μm to 60 μm, and more preferably 20 μm to 50 μm. As a result, the negative electrode plate 20 can be easily cut out from the negative electrode precursor 20A.

Electrode Body Production Step S50

Next, in the manufacturing method according to the present embodiment, the electrode body manufacturing step S50 of manufacturing the electrode body 40 including the positive electrode plate 10, the negative electrode plate 20, and the separator 30 is carried out. As shown in FIG. 6, in this electrode body production step S50, a wound electrode body 40 in which a strip-shaped positive electrode plate 10 and a strip-shaped negative electrode plate 20 are wound via a strip-shaped separator 30 is produced. The separator 30 is a sheet-shaped member having a function of preventing contact between the positive electrode plate 10 and the negative electrode plate 20 and allowing the charge carriers to pass through. An example of such a separator 30 is a resin sheet in which a plurality of fine pores through which a charge carrier can pass are formed. Such a resin sheet preferably includes a resin layer made of a polyolefin resin (for example, polyethylene (PE) or polypropylene (PP)). Further, a heat-resistant layer containing an inorganic filler such as alumina, boehmite, aluminum hydroxide, or titania may be formed on the surface of the resin sheet.

A specific procedure of this step will be explained hereinbelow. Here, first, a laminate is produced in which the separator 30, the negative electrode plate 20, the separator 30, and the positive electrode plate 10 are laminated in this order (see FIG. 6). At this time, the sheet-shaped members are laminated by shifting the lamination positions thereof so that only the positive electrode tabs 12t of the positive electrode plate 10 protrude from one side edge (left side in FIG. 6) in the lateral direction S of each sheet-shaped member, and only the negative electrode tabs 22t of the negative electrode plate 20 protrude from the negative electrode plate 20 from the other side edge (right side in FIG. 6). Then, the laminated body is wound so that a plurality of positive electrode tabs 12t is laminated at the same position on one side edge in the lateral direction S and a plurality of negative electrode tabs 22t is laminated at the same position on the other side edge. The separator 30 is arranged on the outermost circumference of the wound electrode body 40 produced in this manner (see FIG. 7). The shape of the wound electrode body 40 is maintained by attaching a winding stopper tape 38 to a winding end 30a of the separator 30 on the outermost circumference. In the wound electrode body 40, a positive electrode tab group 42 in which the plurality of positive electrode tabs 12t are laminated is formed on one side edge in the axial direction of a winding axis WL. Further, a negative electrode tab group 44 in which the plurality of negative electrode tabs 22*t* are laminated is formed on the other side edge in the axial direction of the wound electrode body 40. A core portion 46 in which the positive electrode active material layer 14 and the negative electrode active material layer 24 face each other is formed in the central portion in the axial direction. The core portion 46 is the main field where the charge/discharge reaction of the secondary battery occurs.

When the wound electrode body 40 having the electrode tabs (positive electrode tabs 12*t*, negative electrode tabs 22) having the above configuration is produced, the cutting length when laser cutting the protective layer application region and the negative electrode active material layer application region tends to increase. Therefore, the protective layer 16 of the positive electrode plate 10 and the negative electrode active material layer 24 of the negative electrode plate 20 are likely to fall off or peel off. However, the manufacturing method according to the present embodiment can adequately prevent the negative electrode active material layer 24 and the protective layer 16 from falling off or peeling off during laser cutting of the protective layer application region or the negative electrode active material layer application region. Therefore, the manufacturing method according to the present embodiment can be particularly preferably used for manufacturing a secondary battery having the wound electrode body 40 having the electrode tabs shown in FIGS. 6 and 7.

A secondary battery can be manufactured by accommodating the wound electrode body 40 produced through the above steps together with an electrolytic solution inside a battery case and connecting the wound electrode body 40 to electrode terminals. As for the specific procedure for constructing the secondary battery using the wound electrode body 40, a conventional well-known manufacturing method can be adopted without particular limitation, and the technique disclosed herein is not limited. Therefore, detailed description will be omitted.

As described above, in the manufacturing method according to the present embodiment, the protective layer application region is cut by the continuous wave laser in the positive electrode cutting step S20. Therefore, it is possible to prevent the protective layer 16 from being blown off from the positive electrode plate 10 during laser irradiation. As a result, the internal short-circuit prevention function of the protective layer 16 can be adequately demonstrated. Meanwhile, in the present embodiment, the negative electrode active material layer application region is cut by the pulsed laser in the negative electrode cutting step S40. Therefore, it is possible to prevent the molten negative electrode core 22 from being mixed with the negative electrode active material layer 24. As a result, it is possible to prevent a part of the negative electrode active material layer 24 from peeling off inside the secondary battery and becoming a conductive foreign matter that causes an internal short circuit. As described above, with the manufacturing method according to the present embodiment, it is possible to prevent the negative electrode active material layer 24 and the protective layer 16 from falling off or peeling off at the laser cutting site of the electrode plate, so that a highly safe secondary battery can be manufactured.

Secondary Battery

Figure 8:
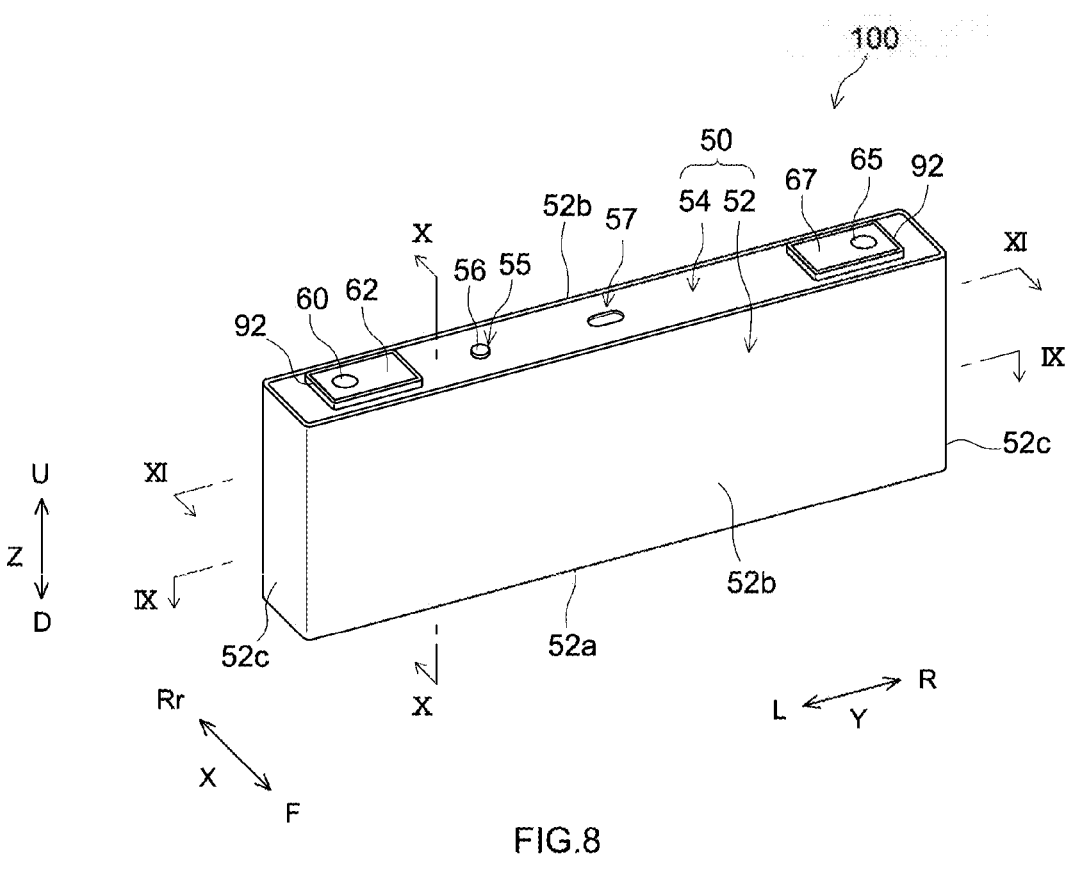
FIG. 8 is a perspective view schematically showing a secondary battery according to an embodiment.
Figure 9:
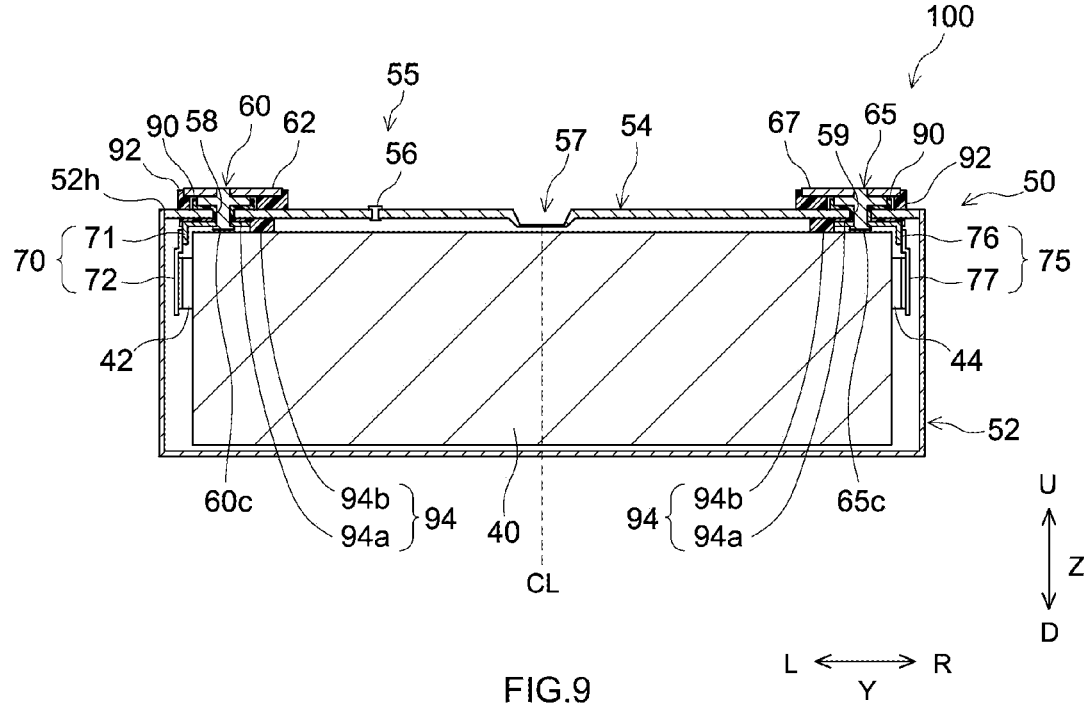
FIG. 9 is a schematic vertical cross-sectional view taken along the IX-IX line in FIG. 8.
Figure 10:
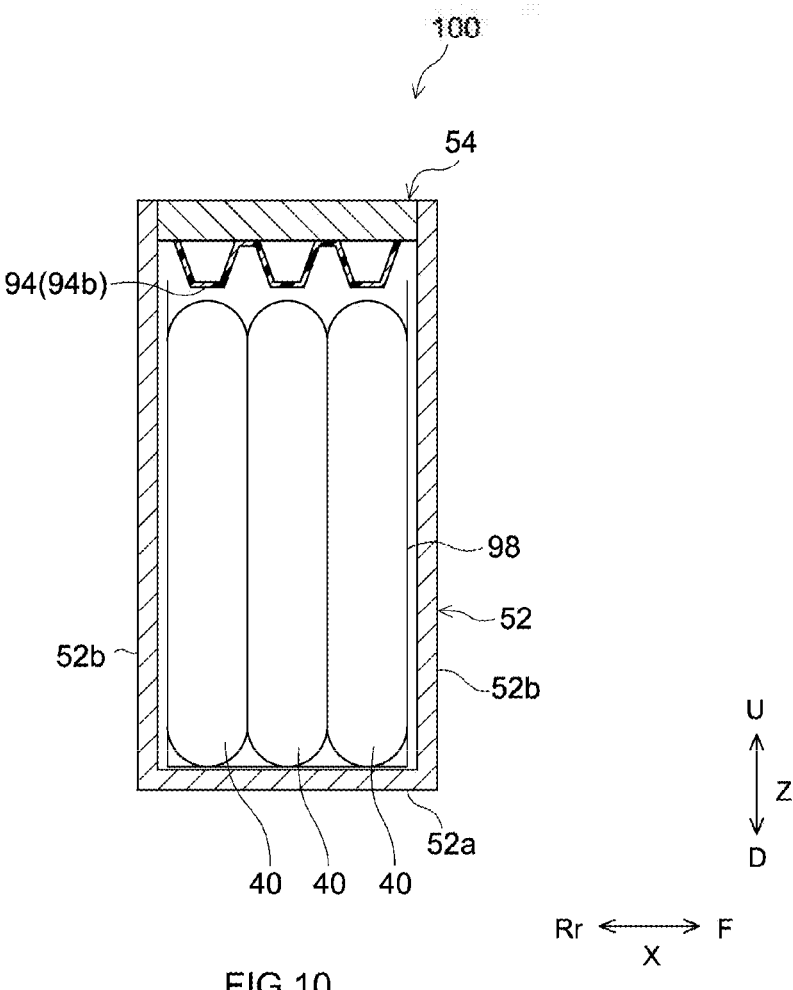
FIG. 10 is a schematic vertical cross-sectional view taken along the line X-X in FIG. 8.
Figure 11:
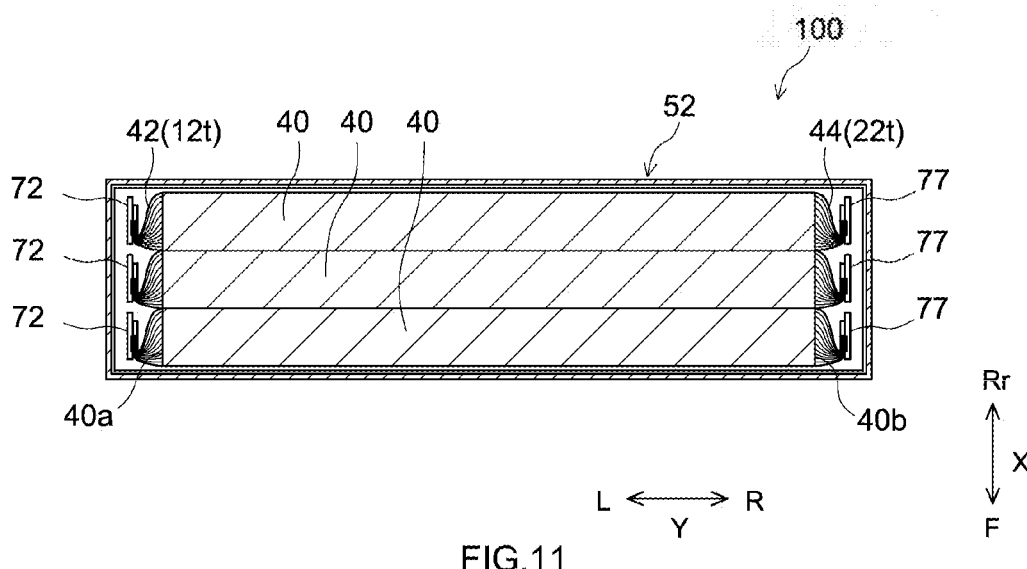
FIG. 11 is a schematic cross-sectional view taken along the line XI-XI in FIG. 8.
Figure 12:
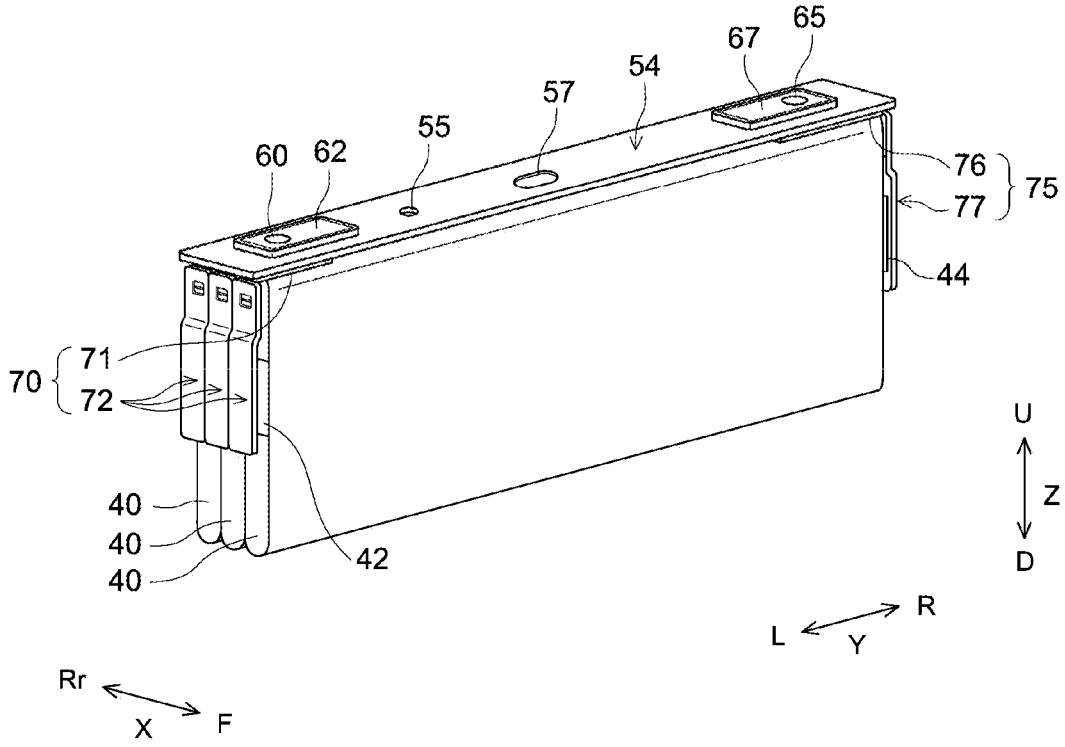
FIG. 12 is a perspective view schematically showing an electrode body attached to a sealing plate.
Figure 13:
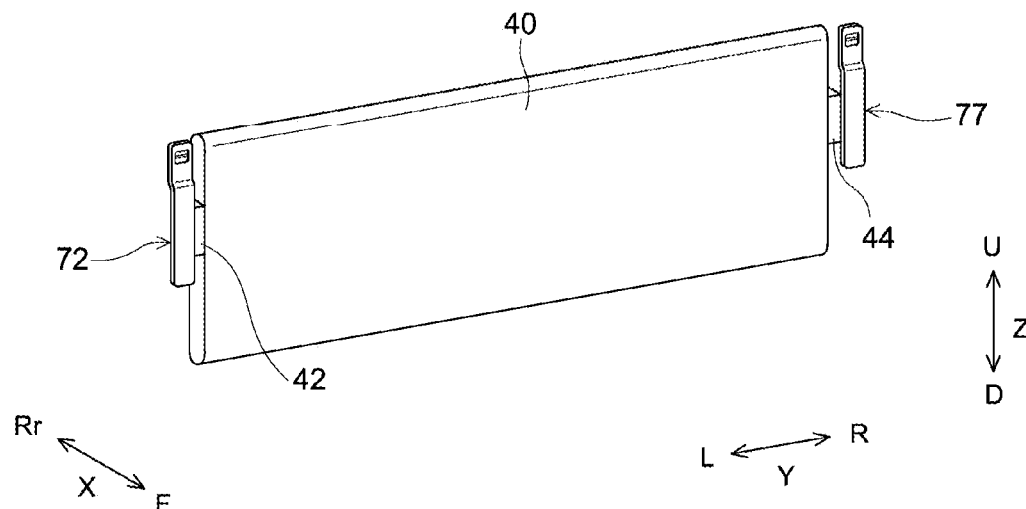
FIG. 13 is a perspective view schematically showing an electrode body to which a positive electrode second current collector and a negative electrode second current collector are attached.
Figure 14:
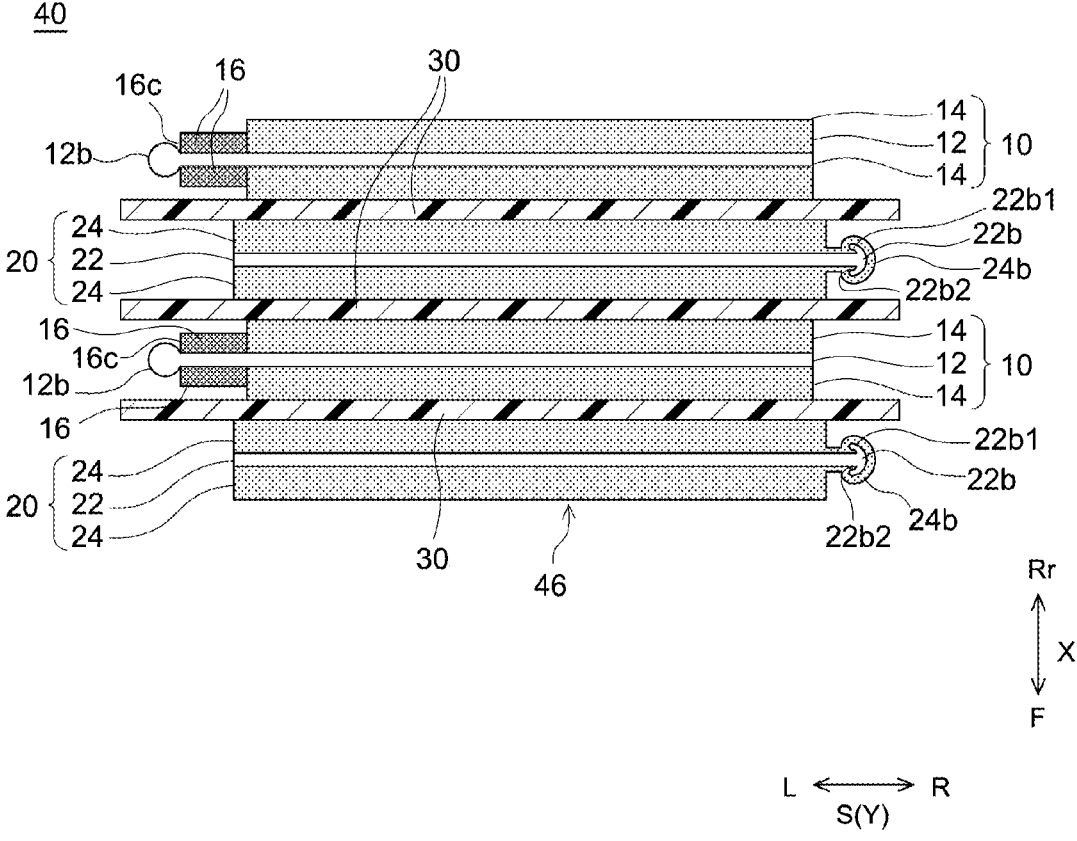
FIG. 14 is a view shown by arrows XIV-XIV in FIG. 7.

Next, the structure of the secondary battery manufactured by the manufacturing method according to the present embodiment will be specifically described. FIG. 8 is a perspective view schematically showing the secondary battery according to the present embodiment. FIG. 9 is a schematic vertical sectional view taken along the line IX-IX in FIG. 8. FIG. 10 is a schematic vertical cross-sectional view taken along the line X-X in FIG. 8. FIG. 11 is a schematic cross-sectional view taken along the line XI-XI in FIG. 8. FIG. 12 is a perspective view schematically showing an electrode body attached to a sealing plate. FIG. 13 is a perspective view schematically showing an electrode body to which a positive electrode second current collector and a negative electrode second current collector are attached, FIG. 14 is a view shown by arrows XIV-XIV in FIG. 7, Reference symbol X in FIGS. 8 to 14 indicates the "lateral direction" of the secondary battery 100, reference symbol Y indicates the "longitudinal direction", and reference symbol Z indicates the "vertical direction". Further, F in the lateral direction X indicates "front", and Rr indicates "rear". L in the longitudinal direction Y indicates "left" and R indicates "right". Then, U in the vertical direction Z indicates "up", and "D" indicates "down". However, these directions are defined for convenience of explanation, and are not intended to limit the installation form of the secondary battery 100.

As shown in FIG. 9, the secondary battery 100 includes the wound electrode body 40, a battery case 50, a positive electrode terminal 60, a negative electrode terminal 65, a positive electrode current collector 70, and a negative electrode current collector 75. Although not shown, a non-aqueous electrolytic solution is accommodated in addition to the wound electrode body 40 inside the battery case 50 of the secondary battery 100. This non-aqueous electrolytic solution is prepared by dissolving a supporting salt in a non-aqueous solvent. Examples of non-aqueous solvents include carbonate solvents such as ethylene carbonate, dimethyl carbonate, ethyl methyl carbonate, and the like. As an example of the supporting salt, a fluorine-containing lithium salt such as $LiPF_6$ can be mentioned.

Battery Case

The battery case 50 is a housing for accommodating the wound electrode body 40. Here, the battery case 50 has a flat and bottomed rectangular parallelepiped outer shape. The material of the battery case 50 is not particularly limited and may be the same as that conventionally used. The battery case 50 is preferably made of metal, and more preferably made of, for example, aluminum, an aluminum alloy, iron, an iron alloy, or the like. As shown in FIG. 9, the battery case 50 includes an exterior body 52 and a sealing plate 54.

The exterior body 52 is a flat bottomed square container having an opening 52*h* on the upper surface. As shown in FIG. 8, the exterior body 52 has a bottom wall 52*a* having a substantially rectangular planar shape, a pair of long side walls 52*b* extending from the long sides of the bottom wall 52*a* in the vertical direction Z, and a pair of short side walls 52*c* extending from the short sides of the bottom wall 52*a* in the vertical direction Z. Meanwhile, the sealing plate 54 is a plate-shaped member having a substantially rectangular planar shape that closes the opening 52*h* of the exterior body 52. The outer peripheral edge of the sealing plate 54 is joined (for example, welded) to the outer peripheral edge of the opening 52*h* of the exterior body 52. As a result, the battery case 50 with an airtightly closed (sealed) interior is produced. Further, the sealing plate 54 is provided with a liquid injection hole 55 and a gas discharge valve 57. The liquid injection hole 55 is provided for injecting a non-aqueous electrolytic solution into the inside of the battery case 50 after joining the exterior body 52 and the sealing plate 54. The liquid injection hole 55 is sealed by the sealing member 56 after the non-aqueous electrolytic solution is injected. Further, the gas discharge valve 57 is a thin portion designed to break (open) at a predetermined pressure and discharge the gas contained in the battery case 50 when a large amount of gas is generated in the battery case 50.

Electrode Terminals

Further, the positive electrode terminal 60 is attached to one end of the sealing plate 54 (left side in FIGS. 8 and 9) of the secondary battery 100 in the longitudinal direction Y. The positive electrode terminal 60 is connected to a plate-shaped positive electrode external conductive member 62 on the outside of the battery case 50. Meanwhile, a negative electrode terminal 65 is attached to the other end of the sealing plate 54 (right side in FIGS. 8 and 9) of the secondary battery 100 in the longitudinal direction Y. A plate-shaped negative electrode external conductive member 67 is also attached to the negative electrode terminal 65. These external conductive members (positive electrode external conductive member 62 and negative electrode external conductive member 67) are connected to another secondary battery or external device via an external connecting member (bus bar or the like). The external conductive members are preferably made of a metal having excellent conductivity (aluminum, aluminum alloy, copper, copper alloy, and the like).

Electrode Current Collector

As shown in FIGS. 10 to 12, in the secondary battery 100 according to the present embodiment, a plurality of (three in the figure) wound electrode bodies 40 is accommodated inside the battery case 50. The positive electrode terminal 60 is connected to each of the plurality of wound electrode bodies 40 via a positive electrode current collector 70 accommodated in the battery case 50. Specifically, the positive electrode current collector 70 that connects the positive electrode terminal 61 and the wound electrode body 40 is accommodated inside the battery case 50. As shown in FIGS. 9 and 12, the positive electrode current collector 70 has a positive electrode first current collector 71 that is a plate-shaped conductive member extending along the inner side surface of the sealing plate 54, and a plurality of positive electrode second current collectors 72 that is a plate-shaped conductive member extending along the vertical direction Z. A lower end portion 60c of the positive electrode terminal 60 extends toward the inside of the battery case 50 through a terminal insertion hole 58 of the sealing plate 54 and is connected to the positive electrode first current collector 71 (see FIG. 9). Meanwhile, as shown in FIGS. 11 to 13, each positive electrode second current collector 72 is connected to the respective positive electrode tab group 42 of the plurality of wound electrode bodies 40. As shown in FIGS. 11 and 12, the positive electrode tab group 42 of the wound electrode body 40 is bent so that the positive electrode second current collector 72 and one side surface 40a of the wound electrode body 40 face each other. As a result, the upper end portion of the positive electrode second current collector 72 and the positive electrode first current collector 71 are electrically connected to each other.

Meanwhile, the negative electrode terminal 65 is connected to each of the plurality of wound electrode bodies 40 via a negative electrode current collector 75 accommodated in the battery case 50. The connection structure on the negative electrode side is substantially the same as the connection structure on the positive electrode side described above. Specifically, the negative electrode current collector 75 has a negative electrode first current collector 76 that is a plate-shaped conductive member extending along the inner surface of the sealing plate 54, and a plurality of negative electrode second current collectors 77 that is a plate-shaped conductive member extending along the vertical direction Z (see FIGS. 9 and 12). A lower end portion 65c of the negative electrode terminal 65 extends toward the inside of the battery case 50 through a terminal insertion hole 59 and is connected to the negative electrode first current collector 76 (see FIG. 9). Meanwhile, each negative electrode second current collector 77 is connected to the respective negative electrode tab group 44 of the plurality of wound electrode bodies 40 (see FIGS. 11 to 13). The negative electrode tab group 44 is bent so that the negative electrode second current collector 77 and the other side surface 40b of the wound electrode body 40 face each other. As a result, the upper end portion of the negative electrode second current collector 77 and the negative electrode first current collector 76 are electrically connected to each other.

Insulating Members

Further, in the secondary battery 100 according to the present embodiment, various insulating members for preventing conduction between the wound electrode body 40 and the battery case 50 are attached. Specifically, an external insulating member 92 is interposed between the positive electrode external conductive member 62 (negative electrode external conductive member 67) and the outer surface of the sealing plate 54 (see FIG. 8). This makes it possible to prevent the positive electrode external conductive member 62 and the negative electrode external conductive member 67 from conducting with the sealing plate 54. Further, a gasket 90 is attached to each of the terminal insertion holes 58 and 59 of the sealing plate 54 (see FIG. 9). As a result, it is possible to prevent the positive electrode terminal 60 (and the negative electrode terminal 65) inserted through the terminal insertion holes 58 and 59 from conducting with the sealing plate 54. Further, an internal insulating member 94 is arranged between the positive electrode first current collector 71 (or the negative electrode first current collector 76) and the inner side surface of the sealing plate 54. The internal insulating member 94 includes a plate-shaped base portion 94a interposed between the positive electrode first current collector 71 (or the negative electrode first current collector 76) and the inner side surface of the sealing plate 54. As a result, it is possible to prevent the positive electrode first current collector 71 and the negative electrode first current collector 76 from conducting with the sealing plate 54. Further, the internal insulating member 94 includes a protruding portion 94b that protrudes from the inner side surface of the sealing plate 54 toward the wound electrode body 40 (see FIGS. 9 and 10). As a result, the movement of the wound electrode body 40 in the vertical direction Z can be restricted, and the wound electrode body 40 and the sealing plate 54 can be prevented from coming into direct contact with each other. In addition, the wound electrode body 40 is accommodated inside the battery case 50 in a state of being covered with an electrode body holder 98 (see FIG. 10) made of an insulating resin sheet. As a result, it is possible to prevent the wound electrode body 40 and the exterior body 52 from coming into direct contact with each other. The material of each of the above-mentioned insulating members is not particularly limited as long as it has a predetermined insulating property. As an example, synthetic resin materials such as polyolefin resins (for example, polypropylene (PP) and polyethylene (PE)) and fluororesins (for example, perfluoroalkoxyalkanes (PFA) and polytetrafluoroethylene (PTFE)) can be used.

Wound Electrode Body

In the secondary battery 100 according to the present embodiment, the wound electrode body 40 produced by the above-mentioned manufacturing method is used. In the secondary battery 100, the wound electrode body 40 is accommodated inside the battery case 50 so that the winding axis WL of the wound electrode body 40 and the longitudinal direction Y of the battery case 50 coincide with each other. That is, in the secondary battery 100 according to the present embodiment, the "lateral direction S of the electrode plate" shown in FIGS. 2 to 7 and the "longitudinal direction Y of the secondary battery" shown in FIGS. 8 to 14 are substantially the same direction. The term "substantially the same direction" as used herein means that a slight deviation in the direction caused by variations during manufacturing is allowed.

Here, in the wound electrode body 40, as shown in FIG. 14, a first thick portion 12*b* having a thickness larger than the thickness of the positive electrode core 12 in the central region (near the core portion 46) of the positive electrode plate 10 is formed at the end of the positive electrode core 12 on the end side (the left end side in the longitudinal direction Y) adjacent to the protective layer 16 of the positive electrode plate 10. The first thick portion 12*b* is a trace of irradiation with the continuous wave laser in the positive electrode cutting step S20. The first thick portion 12*b* is formed as a result of solidification of the positive electrode core 12 once melted by the heat from the continuous wave laser. Further, a ceramic sintered body may be formed on an end surface 16*c* of the protective layer 16 of the positive electrode plate 10 so as to cover the protective layer 16 (see the black portion in FIG. 15). Where such a ceramic sintered body is formed, peeling/detachment of the protective layer 16 can be more suitably prevented. Meanwhile, a second thick portion 22*b* having a thickness larger than the thickness of the negative electrode core 22 in the central region of the negative electrode plate 20 is formed at the end of the negative electrode core 22 on one short side (the right end side in the longitudinal direction Y) of the two end sides adjacent to the negative electrode active material layer 24 of the negative electrode plate 20. The second thick portion 22*b* is a trace of irradiation with the pulsed laser in the negative electrode cutting step S40. The second thick portion 22*b* is formed as a result of solidification of the negative electrode core 22 once melted by the heat from the pulsed laser. Further, the coating layer 24*b* is attached to the surface of the second thick portion 22*b*. The coating layer 24*b* is obtained by modification of the negative electrode active material layer 24 by the heat of the pulsed laser. Specifically, the coating layer 24*b* is formed as a result of densification of the negative electrode active material in the negative electrode active material layer 24 or a carbon material (or a compound including a carbon element) such as a carbonized additive (binder or the like). Since the coating layer 24*b* has excellent adhesion to the surface of the negative electrode core 22 (second thick portion 22*b*), the occurrence of an internal short circuit due to peeling/falling off of the conductive foreign matter can be suitably prevented.

Further, as shown in FIG. 14, the first thick portion 12*b* having a substantially spherical cross-sectional shape is formed. This is because the first thick portion 12*b* is formed as a result of solidification of the end portion of the positive electrode core 12 that has been once melted by the continuous wave laser. Meanwhile, the second thick portion 22*b* has a claw shape including a cap portion 22*b*1 protruding on both sides or one side in the thickness direction (lateral direction X in FIG. 14) of the negative electrode core 22, and a recess 22*b*2 formed between the cap portion 22*b*1 and the negative electrode core 22. Unlike the first thick portion 12*b* of the positive electrode core 12, the second thick portion 22*b* is formed by cutting with the pulsed laser, so that the amount of melting of the negative electrode core 22 is small, and the claw shape as described above may be formed. The coating layer 24*b* is embedded in the recess 22*b*2 of the claw-shaped second thick portion 22*b*. As a result, an excellent anchoring effect is exhibited, and the coating layer 24*b* can be firmly held. As a consequence, it is possible to more preferably prevent the conductive foreign matter (negative electrode active material layer 24, coating layer 24*b*) from falling off or peeling off. Where such a claw-shaped second thick portion 22*b* is formed on the negative electrode core 22, the separator 30 in contact with the second thick portion 22*b* may be damaged. However, in the present embodiment, since the second thick portion 22*b* is covered with the coating layer 24*b*, it is possible to suitably prevent the separator 30 from being damaged by the claw-shaped second thick portion 22*b*.

The thickness of the cap portion 22*b*1 of the second thick portion 22*b* is preferably 1 μm or more, more preferably 2.5 μm or more, and still more preferably 4 μm or more. As a result, a more suitable anchoring effect can be exhibited. The "thickness of the cap portion" is the thickness of one side of the cap portion 22*b*1 with respect to the surface of the core (dimension in the lateral direction X in FIG. 14). Further, from the viewpoint of more reliably preventing damage to the separator 30, the upper limit of the thickness of the cap portion 22*b*1 is preferably 30 μm or less, more preferably 25 μm or less, and still more preferably 20 μm or less. Meanwhile, the width of the cap portion 22*b*1 (dimension in the longitudinal direction Y in FIG. 14) is not particularly limited. For example, the width of the cap portion 22*b*1 may be 1 μm to 30 μm, 5 μm to 25 μm, or 10 μm to 20 μm. Further, the height of the inlet of the recess 22*b*2 of the second thick portion 22*b* (dimension in the lateral direction X in FIG. 14) is preferably 1 μm to 10 μm, and more preferably 2.5 μm to 7.5 μm. Meanwhile, the depth of the recess 22*b*2 of the second thick portion 22*b* (dimension in the longitudinal direction Y in FIG. 14) is preferably 0.1 to 10 μm, and more preferably 2.5 μm to 7.5 μm. As a result, an adequate amount of the coating layer 24*b* can be held inside the recess 22*b*2, and a more suitable anchoring effect can be exhibited. Further, the angle at which the cap portion 22*b*1 rises from the surface of the negative electrode core 22 is preferably more than 0° and 90 or less.

Further, it is preferable that the first thick portion 12*b* protrude to the outside (on the left side in the longitudinal direction Y in FIG. 14) from the end surface 16*c* of the protective layer 16. Since the first thick portion 12*b* is thicker than the other regions of the positive electrode core 12, when the protective layer 16 is projected outward from the end surface 16*c* of the protective layer 16, the protective layer 16 can be prevented from moving in the longitudinal direction Y. As a result, the protective layer 16 can be suitably prevented from breaking off and falling off on the outside in the longitudinal direction Y. From the viewpoint of more adequately retaining the protective layer 16 by the first thick portion 12*b*, it is preferable that the thickness of the first thick portion 12*b* (dimension in the lateral direction X in FIG. 14) be 15 μm to 50 μm. The "thickness of the first thick portion" in the present description refers to the maximum dimension of the first thick portion in the thickness direction (lateral direction X in FIG. 14) of the wound electrode body. Meanwhile, the ratio of the thickness of the coating layer of the second thick portion 22*b* to the thickness of the negative electrode active material layer 24 is preferably 0.01 to 0.2.

Further, although it is not intended to limit the technique disclosed herein, the thickness of the second thick portion 22*b* of the negative electrode core 22 in the secondary battery 100 produced by the above-mentioned manufacturing method can be smaller than the thickness of the first thick portion 12b of the positive electrode core 12. In the positive electrode cutting step S20 in the above-mentioned manufacturing method, the positive electrode core 12 is cut while being gradually melted by using a continuous wave laser. Meanwhile, in the negative electrode cutting step S40, the amount of melting of the negative electrode core 22 is reduced by using a pulsed laser. As described above, the second thick portion 22b of the negative electrode core 22 is formed of less metal than the first thick portion 12b of the positive electrode core 12, so that the thickness of the second thick portion 22b is smaller than that of the first thick portion 12b.

Further, in the electrode body 40 of the present embodiment, the stacking position of each sheet-shaped member is determined so that the boundary between the coating layer 24b of the negative electrode plate 20 and the negative electrode active material layer 24 is located outside the side edge portion of the positive electrode active material layer 14 in the longitudinal direction Y. As a result, a decrease in capacity due to precipitation of charge carriers during charging/discharging can be prevented. Specifically, as described above, the merit of the coating layer 24b formed on the negative electrode plate 20 is that peeling off or failing off from the negative electrode core 22 is unlikely, but the drawback is that because the thickness thereof is reduced, the function as a negative electrode active material layer (ability to occlude and release the charge carriers) is poor. Therefore, where the coating layer 24b and the positive electrode active material layer 14 are opposed to each other, the distribution of the charge/discharge reaction on the reaction surface (flat surface of the core portion 46) of the wound electrode body 40 becomes non-uniform, and charge carriers may precipitate. For this reason, it is preferable to arrange the boundary between the coating layer 24b and the negative electrode active material layer 24 in a region not facing the positive electrode active material layer 14 so that the coating layer 24b does not contribute to the charge/discharge reaction.

Other Embodiments

One embodiment of the technique disclosed herein has been described above. It should be noted that the above-described embodiment illustrates an example to which the technique disclosed herein is applied, and does not limit the technique disclosed herein.

For example, in the above-described embodiment, a wound electrode body is used as the electrode body. However, the electrode body may be any one including a positive electrode plate, a negative electrode plate, and a separator, and is not limited to the wound electrode body. Another example of such an electrode body is a laminated electrode body in which a plurality of positive electrode plates and negative electrode plates are sequentially laminated with a separator interposed therebetween. In order to produce a positive electrode plate to be used for this type of laminated electrode body, it is preferable to perform cutting along the lateral direction S as shown by a double-dot-dash line $L_{P3}$ in FIG. 3 for each positive electrode tab 12. Similarly, in order to produce a negative electrode plate for the laminated electrode body, cutting along the lateral direction S as shown by a double-dot-dash line $L_{N3}$ in FIG. 5 may be performed for each negative electrode tab 22t. Then, a laminate electrode body can be produced by laminating the electrode plates with a separator interposed therebetween so that the positive electrode tabs 12t of the positive electrode plates are laminated at the same position and the negative electrode tabs 22t of the negative electrode plates are laminated at the same position. Since each of the protective layer application region of the positive electrode precursor and the negative electrode active material layer application region of the negative electrode precursor can be cut by a laser also in the manufacturing process of the secondary battery having such a laminated electrode body, the technique disclosed herein can be applied thereto.

Further, the above-described embodiment is aimed at a high-capacity secondary battery 100 in which three wound electrode bodies 40 are accommodated inside the battery case 50. However, the number of electrode bodies accommodated in one battery case is not particularly limited, and may be two or more (plural) or one. Further, the secondary battery 100 according to the above-described embodiment is a lithium ion secondary battery in which lithium ions are charge carriers. However, the secondary battery disclosed herein is not limited to the lithium ion secondary battery. Since each of the protective layer application region of the positive electrode precursor and the negative electrode active material layer application region of the negative electrode precursor can be cut by a laser also in the manufacturing process of another secondary battery (for example, nickel-hydrogen battery or the like), the technique disclosed herein can be applied thereto.

Further, the secondary battery 100 according to the above-described embodiment is a non-aqueous electrolyte secondary battery using a non-aqueous electrolytic solution as an electrolyte. However, the techniques disclosed herein can also be applied to batteries other than non-aqueous electrolyte secondary batteries. Another example of the structure of a secondary battery is an all-solid-state battery. In the all-solid-state battery, a solid electrolyte layer, obtained by molding a solid electrolyte to have a sheet shape, is used as a separator interposed between a positive electrode plate and a negative electrode plate. In the all-solid-state battery, the separator and the electrolyte are integrated and contained inside the electrode body, so that leakage of the electrolytic solution and the like can be prevented. Since each of the protective layer application region of the positive electrode precursor and the negative electrode active material layer application region of the negative electrode precursor can be cut by a laser also in the manufacturing process of this type of all-solid-state battery, the technique disclosed herein can be applied thereto.

Test Example

Hereinafter, a test example relating to the present disclosure will be described. The contents of the test example described hereinbelow are not intended to limit the present disclosure.

1. Preparation of Each Sample
(1) Sample 1
In Sample 1, first, a positive electrode precursor in which a positive electrode active material layer having a thickness of 62 μm was applied to both sides of a positive electrode core (aluminum foil) having a thickness of 13 μm was prepared. The positive electrode active material layer of the positive electrode precursor included a positive electrode active material, a conductive material, and a binder in a ratio of 97.5:1.5:1.0. A lithium-nickel-cobalt-manganese-based composite oxide (NCM) was used as the positive electrode active material. Further, acetylene black (AB) was used as the conductive material. Polyvinylidene fluoride (PVdF)

was used as the binder. Further, a protective layer having a thickness of 30 μm was applied to the positive electrode precursor so as to be adjacent to the positive electrode active material layer. The protective layer included ceramic particles (alumina particles), a conductive material (graphite), and a binder (PVdF) in a ratio of 83:3:14.

Next, the region to which the protective layer of the positive electrode precursor was applied (protective layer application region) was cut, and a positive electrode plate having a predetermined size was cut out. Here, in Sample 1, a continuous wave laser (CW laser) was used to cut the protective layer application region. The output of the continuous wave laser was set to 1000 W. The scanning speed was set to 6000 mm/sec, and the spot diameter was set to 20 μm.

(2) Sample 2

In Sample 2, a positive electrode plate was prepared under the same conditions as in Sample 1, except that a pulsed laser was used when cutting the protective layer application region of the positive electrode precursor. The average output of the pulsed laser was set to 20 W, and the scanning speed was set to 350 mm/sec. The pulse width of the pulsed laser was set to 30 ns, and the repetition frequency was set to 100 KHz. The spot diameter of the pulsed laser was set to 30 μm.

(3) Sample 3

In sample 3, the cutting target was changed to a negative electrode precursor. Specifically, first, a negative electrode precursor in which a negative electrode active material layer having a thickness of 80 μm was applied to both sides of a negative electrode core (copper foil) was prepared. The negative electrode active material layer of the negative electrode precursor included a negative electrode active material, a thickener, and a binder in a ratio of 98.3:0.7:1.0. Graphite was used as the negative electrode active material, carboxymethyl cellulose (CMC) was used as the thickener, and styrene butadiene rubber (SBR) was used as the binder. Then, in Sample 3, the negative electrode active material layer application region of the negative electrode precursor having the above configuration was cut with a continuous wave laser to produce a negative electrode plate having a predetermined size. The conditions of the continuous wave laser in this sample are the same as those of Sample 1.

(4) Sample 4

In Sample 4, a negative electrode plate was prepared under the same conditions as in Sample 3, except that a pulsed laser was used to cut the negative electrode active material layer application region of the negative electrode precursor. The average output of the pulsed laser was set to 210 W, and the scanning speed was set to 1000 mm/sec. The pulse width of the pulsed laser was set to 120 ns, and the repetition frequency was set to 400 KHz. The spot diameter of the pulsed laser was set to 30 sm.

2. Evaluation Test

Figure 15:
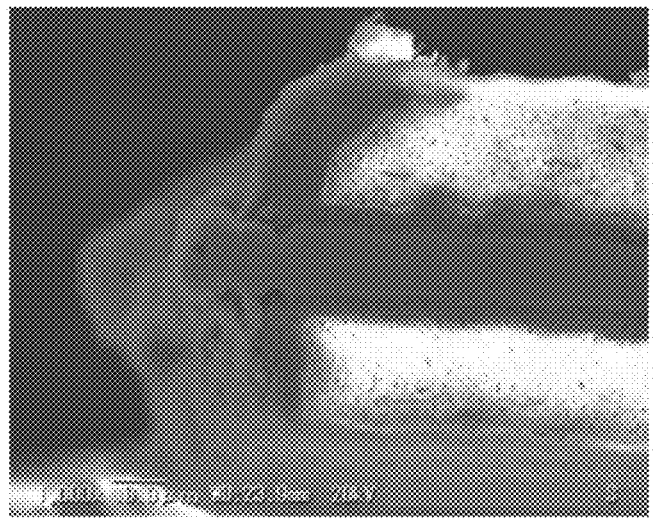
FIG. 15 is an SEM microphotograph of the protective layer application region of sample 1.
Figure 16:
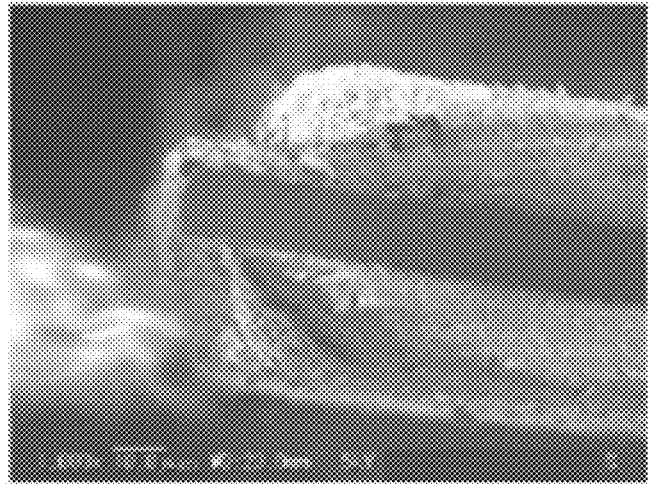
FIG. 16 is an SEM microphotograph of a protective layer application region of sample 2.
Figure 17:
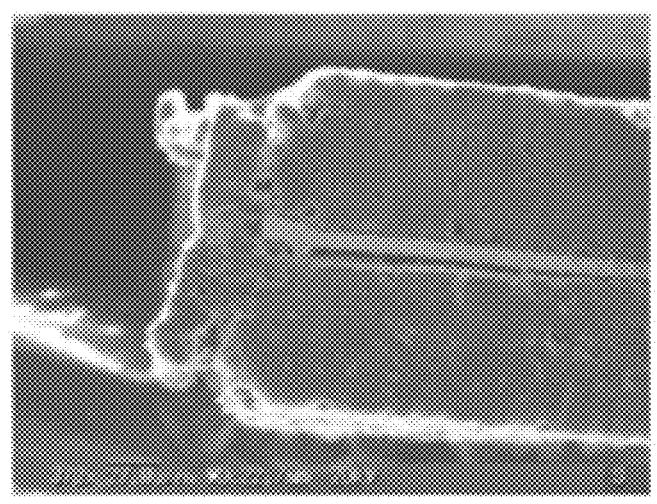
FIG. 17 is an SEM microphotograph of the negative electrode active material layer application region of sample 3.
Figure 18:
FIG. 18 is an SEM microphotograph of the negative electrode active material layer application region of sample 4.

In this test, the laser cutting points (protective layer application region or negative electrode active material layer application region) in each of the above samples were observed at a magnification of 1000 times using a scanning electron microscope (SEM). The observation results are shown in FIGS. 15 to 18. FIG. 15 is a cross-sectional SEM microphotograph of the protective layer application region of Sample 1. FIG. 16 is a cross-sectional SEM microphotograph of the protective layer application region of Sample 2. FIG. 17 is a cross-sectional SEM microphotograph of the negative electrode active material layer application region of Sample 3. FIG. 18 is a cross-sectional SEM microphotograph of the negative electrode active material layer application region of Sample 4.

First, as shown in FIG. 16, in Sample 2, the protective layer fell off and the positive electrode core was exposed at the portion irradiated with the pulsed laser. It is understood that this is because the protective layer was blown off by the impact of the laser irradiation as a result of using the pulsed laser that cuts the protective layer application region of the positive electrode precursor. Meanwhile, as shown in FIG. 15, in Sample 1, the protective layer at the portion irradiated with the laser was held on the surface of the positive electrode core without falling off or peeling off. From this, it was found that when the protective layer application region of the positive electrode precursor is cut, the protective layer can be prevented from falling off or peeling off by using a continuous wave laser and alleviating the impact during laser irradiation.

Further, when the laser irradiation position in Sample 1 was observed, it was found that a first thick portion thicker than the other regions of the positive electrode core was formed at the end of the positive electrode core (the end portion of the left side in FIG. 15). It is presumed that this first thick portion was formed by solidification of the positive electrode core that was once melted, and the cross-sectional shape of the first thick portion was substantially circular. Since the first thick portion restricts the movement of the protective layer to the outside in the width direction, it is expected that the first thick portion can contribute to the prevention of the protective layer from falling off. Further, at the end of the protective layer irradiated with the continuous wave laser, a ceramic sintered body was formed by sintering of the protective layer (black portion in FIG. 15). Since this ceramic sintered body is formed so as to cover the protective layer, it is expected that the protective layer will be more suitably prevented from falling off or peeling off.

Meanwhile, as shown in FIG. 17, in Sample 3, a negative electrode active material layer that shrunk more than the other negative electrode active material layers has adhered to the portion irradiated with the continuous wave laser (the left end in FIG. 17). As a result of analyzing this shrunk negative electrode active material layer, it was found that copper derived from the molten negative electrode core was mixed and solidified, and that the solidified copper was easily detached and peeled off by a small impact. Meanwhile, as shown in FIG. 18, in Sample 4, a coating layer covering the negative electrode core was formed at the portion irradiated with the pulsed laser. When such a coating layer was confirmed, it was found that a carbon material derived from a negative electrode active material, a carbonized binder, or the like adhered to the negative electrode core at a high density. The coating layer contained almost no copper derived from the negative electrode core. From this, it was understood that when cutting the negative electrode active material layer application region of the negative electrode precursor, the negative electrode active material layer can be prevented from falling off or peeling off by cutting the negative electrode core by using a pulsed laser that rapidly raises the temperature of the negative electrode core.

Further, when the laser irradiation position in Sample 4 was observed, it was found that a second thick portion thicker than the other regions was formed at the end portion of the negative electrode core. The second thick portion of the negative electrode core was different from the first thick portion of the positive electrode core (see FIG. 15) and had claw shape including a cap portion protruding to one side in the thickness direction and a recess formed between the cap portion and the negative electrode core. It is understood that this is because the amount of melting of the negative electrode core is reduced in the second thick portion of the negative electrode core cut by the pulsed laser as compared with the first thick portion of the positive electrode core cut by the continuous wave laser. The claw-shaped second thick portion exerts an excellent anchoring effect and firmly holds the coating layer, so that it is possible to more suitably prevent the conductive foreign matter from falling off or peeling off. Further, where such a claw-shaped second thick portion is formed on the negative electrode core, the separator in contact with the second thick portion may be damaged. However, in Sample 4, since the second thick portion is covered with the coating layer, it is expected that damage to the separator caused to the claw-shaped second thick portion can be suitably prevented.

The present disclosure has been described in detail above, but the above description is merely an example. That is, the technique disclosed herein is inclusive of various changes and modifications of the above-mentioned specific examples.

What is claimed is:

1. A method for manufacturing a secondary battery having an electrode body including a positive electrode plate, a negative electrode plate, and a separator, the method comprising:

a step of preparing a positive electrode precursor, in which a positive electrode active material layer including a positive electrode active material and a protective layer having lower electrical conductivity than the positive electrode active material layer has been applied to a surface of a positive electrode core, which is a strip-shaped metal foil;

a step of cutting a region of the positive electrode precursor, where the protective layer has been applied, by a continuous wave laser;

a step of preparing a negative electrode precursor, in which a negative electrode active material layer including a negative electrode active material has been applied to a negative electrode core, which is a strip-shaped metal foil; and a step of cutting a region of the negative electrode precursor, where the negative electrode active material layer has been applied, by a pulsed laser, wherein a repetition frequency of the pulsed laser for cutting the negative electrode precursor is 100 KHz to 2000 KHz.

2. The method for manufacturing a secondary battery according to claim 1, wherein an output of the continuous wave laser for cutting the positive electrode precursor is 500 W to 2000 W.

3. The method for manufacturing a secondary battery according to claim 1, wherein a scanning speed of the continuous wave laser for cutting the positive electrode precursor is 2000 mm/sec to 10000 mm/sec.

4. The method for manufacturing a secondary battery according to claim 1, wherein a spot diameter of the continuous wave laser for cutting the positive electrode precursor is 10 μm to 60 μm.

5. The method for manufacturing a secondary battery according to claim 1, wherein an average output of the pulsed laser for cutting the negative electrode precursor is 80 W to 300 W.

6. The method for manufacturing a secondary battery according to claim 1, wherein a scanning speed of the pulsed laser for cutting the negative electrode precursor is 5000 mm/sec or less.

7. The method for manufacturing a secondary battery according to claim 1, wherein a pulse width of the pulsed laser for cutting the negative electrode precursor is 30 ns to 240 ns.

8. The method for manufacturing a secondary battery according to claim 1, wherein a spot diameter of the pulsed laser for cutting the negative electrode precursor is 10 μm to 60 μm.

9. The method for manufacturing a secondary battery according to claim 1, wherein the positive electrode core is configured of aluminum or an aluminum alloy.

10. The method for manufacturing a secondary battery according to claim 1, wherein the negative electrode core is configured of copper or a copper alloy.

11. The method for manufacturing a secondary battery according to claim 1, wherein the protective layer includes ceramic particles and a binder.

*　　*　　*　　*　　*